United States Patent
Aoki et al.

(10) Patent No.: US 7,483,160 B2
(45) Date of Patent: Jan. 27, 2009

(54) COMMUNICATION SYSTEM, COMMUNICATION TERMINAL, SYSTEM CONTROL PROGRAM PRODUCT AND TERMINAL CONTROL PROGRAM PRODUCT

(75) Inventors: Kazuma Aoki, Kasugai (JP); Kazuhiro Yamagata, Nagoya (JP); Katsunori Enomoto, Toyokawa (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 983 days.

(21) Appl. No.: 10/661,621

(22) Filed: Sep. 15, 2003

(65) Prior Publication Data
US 2004/0064790 A1 Apr. 1, 2004

(30) Foreign Application Priority Data
Sep. 30, 2002 (JP) .............................. 2002-284864

(51) Int. Cl.
*G06F 15/00* (2006.01)
(52) U.S. Cl. .................... 358/1.15; 358/1.12; 358/1.18; 715/205; 715/221; 715/230; 715/760; 707/3; 707/10
(58) Field of Classification Search ................ 358/1.15, 358/1.12, 1.18; 715/525–527, 537, 760, 715/205, 221, 230; 707/3, 10
See application file for complete search history.

(56) References Cited

U.S. PATENT DOCUMENTS

| | | | |
|---|---|---|---|
| 5,870,767 A | 2/1999 | Kraft, IV | |
| 6,029,182 A * | 2/2000 | Nehab et al. | 715/523 |
| 6,141,111 A * | 10/2000 | Kato | 358/1.15 |
| 7,142,318 B2 * | 11/2006 | Lopez et al. | 358/1.15 |
| 7,209,246 B2 * | 4/2007 | Suda et al. | 358/1.14 |
| 2002/0114002 A1 * | 8/2002 | Mitsubori et al. | 358/1.15 |

FOREIGN PATENT DOCUMENTS

| | | |
|---|---|---|
| JP | A 10-162030 | 6/1998 |
| JP | A 10-283313 | 10/1998 |
| JP | A 2001-14210 | 1/2001 |
| JP | A 2001-109842 | 4/2001 |
| JP | A 2002-182865 | 6/2002 |
| JP | A 2002-222075 | 8/2002 |

* cited by examiner

*Primary Examiner*—David K Moore
*Assistant Examiner*—Mark R Milia
(74) *Attorney, Agent, or Firm*—Oliff & Berridge, PLC

(57) ABSTRACT

In a communication system, an access source page is printed, together with an entry column and code regions on a sheet of paper, the entry column being provided for entering a command content to access destination pages, the code regions being provided for entering codes for specifying access destination pages corresponding to the entry column. Then, the sheet of paper on which the command content has been entered by a user is read. A URL of an access destination page corresponding to each entry column in which the command content has been entered is specified on the basis of contents entered in the code regions, a link list or a text file. At least one command to the specified URL is specified on the basis of check-off states of check columns constituting each entry column. Then, at least one process corresponding to the command is applied to the URL.

25 Claims, 9 Drawing Sheets

FIG. 3

| NUMBER | ACCESS DESTINATION INFORMATION | URL |
|---|---|---|
| 0 | - | http://•••••• |
| 1 | ACCESS DESTINATION 1 | http://•••••• |
| 2 | ACCESS DESTINATION 2 | http://•••••• |
| ⋮ | ⋮ | ⋮ |

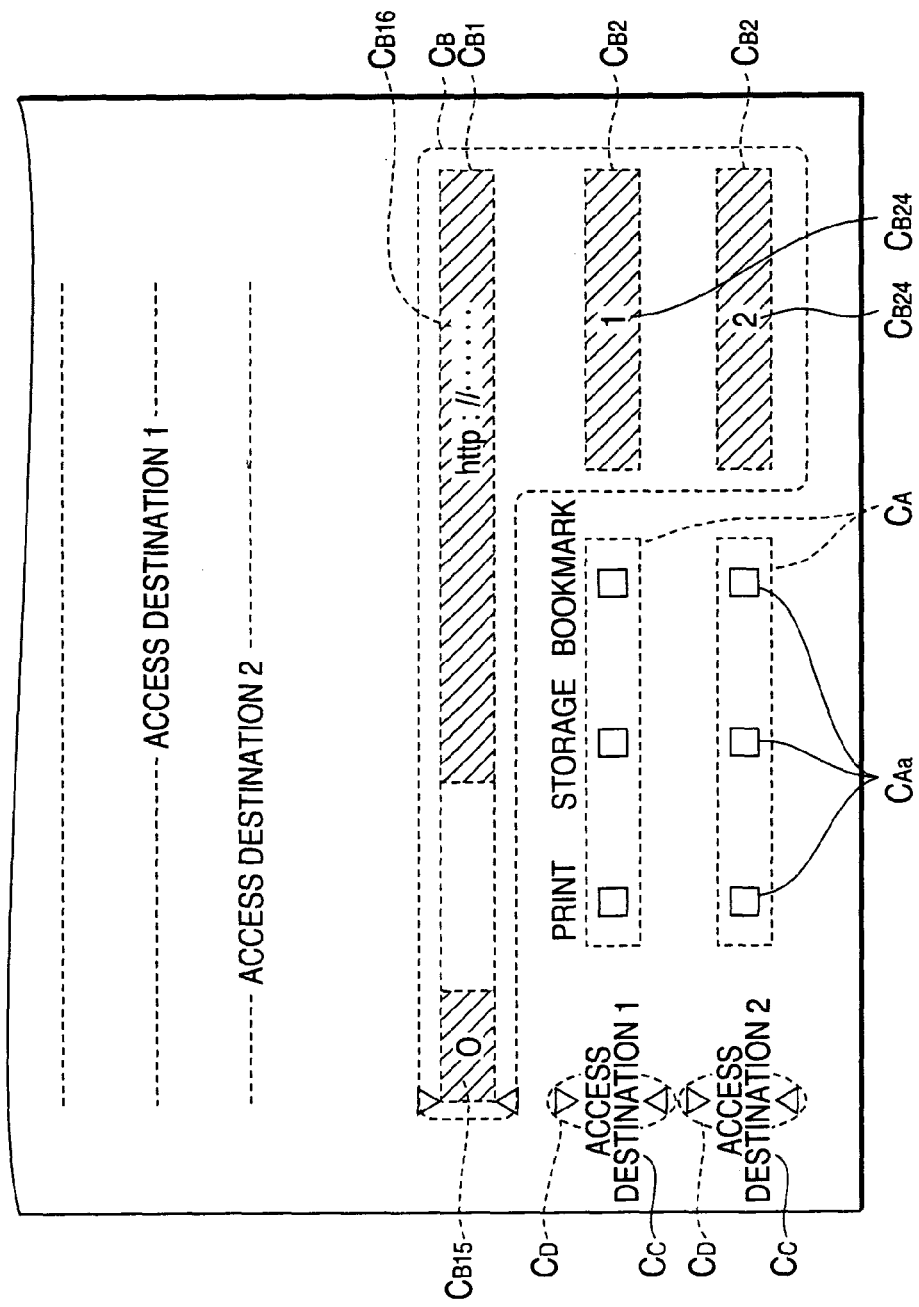

COMMUNICATION SYSTEM, COMMUNICATION TERMINAL, SYSTEM CONTROL PROGRAM PRODUCT AND TERMINAL CONTROL PROGRAM PRODUCT

BACKGROUND OF THE INVENTION

1. Field of the Invention

The present invention relates to a communication system, a communication terminal, a system control program product and a terminal control program product used in a state where the communication system/terminal is connected to a network.

2. Description of the Related Art

In recent years, a communication system used in a state where the communication system is connected to a network may have a printer function. An image of a Web page accessed through the network may be printed on a printing medium so that the Web page can be browsed through the printed image.

A Web page accessed through the network often contains access data (e.g., URLs) for accessing (linking) other Web pages. If nothing but printing of an image of the Web page is performed, it is impossible to check whether the Web page contains access data or not. It is also impossible to check which Web page can be accessed from the Web page. The access data cannot be held in the printing medium.

Therefore, as described in JP-A-10-162030, there has been proposed a method in which an image obtained by addition of footnotes made of character strings (i.e., URLs) expressing access data to an image of a Web page is printed on a printing medium in order to hold the access data in the printing medium when, for example, the Web page (hypertext document) contains access data (hyperlink addresses).

According to the proposed method, access data can be held even in the printing medium because a user can check on the basis of the footnotes printed on the printing medium whether the Web page contains access data and which Web page can be accessed from the Web page.

In the proposed method, improvement in convenience for browsing the Web page through the recording medium can be expected if some processing can be performed on the access data contained in the Web page while the Web page is browsed through the recording medium. Here, the term "some processing" means the same process as a process that can be executed after a right click button of a mouse or a menu key of a keyboard is pushed down while the Web page is being browsed through a Web browser (WWW browser) on a computer. For example, the term "some processing" means a process such as accessing a Web page indicated by address data, recording (storing) the Web page as data (file) or printing the Web page.

In the proposed method, it is however impossible to apply the process to access data contained in the Web page because nothing but printing character strings indicating the access data as footnotes can be performed.

SUMMARY OF THE INVENTION

The present invention has been made to solve the above problems, and therefore an object of the invention is to provide a communication system and a communication terminal in which some processing can be applied to access data contained in a Web page when the Web page is browsed through a printing medium, and to provide a system/terminal control program product that can be used in the communication system/terminal.

In order to achieve the object, according to a first aspect of the invention, there is provided a communication system used in a state where the communication system is connected to a network, including: an access unit configured to access a Web page through the network; a data extraction unit configured to extract access data from the Web page accessed by the access unit in order to use the access data for accessing access destination pages accessible through the Web page; a printing unit configured to print an image of the Web page accessed by the access unit, together with an entry column and a specific code, on a printing medium, the entry column being provided for making a user to enter a command content for requesting a process for the access data extracted by the data extraction unit, the specific code being provided for specifying correspondence of the entry column to the access data; a reading unit configured to read the command content entered in the entry column of the printing medium and the specific code from the printing medium printed by the printing unit; a data specifying unit configured to specify the access data corresponding to the entry column having the command content read by the reading unit, on the basis of the specific code read together with the command content; and a process execution unit configured to execute a process corresponding to the command content read by the reading unit, for the access data specified by the data specifying unit.

According to a second aspect of the invention, there is provided a communication terminal used in a state where the communication terminal is connected to a network, including: an access unit configured to access a Web page through the network; a data extraction unit configured to extract access data from the Web page accessed by the access unit in order to use the access data for accessing access destination pages accessible through the Web page; and a printing unit configured to print an image of the Web page accessed by the access unit, together with an entry column and a specific code, on a printing medium, the entry column being provided for making a user to enter a command content for requesting a process for the access data extracted by the data extraction unit, the specific code being provided for specifying correspondence of the entry column to the access data.

According to a third aspect of the invention, there is provided a communication terminal used in a state where the communication terminal is connected to a network, including: a reading unit configured to read a command content entered in an entry column of a recording medium and a specific code from the recording medium on which an image of a Web page is printed together with the entry column and the specific code, the entry column being provided for making a user to enter the command content for requesting a process for access data for accessing access destination pages accessible through the Web page, the specific code being provided for specifying correspondence of the entry column to the access data; a data specifying unit configured to specify the access data corresponding to the entry column having the command content read by the reading unit, on the basis of the specific code read together with the command content; and a process execution unit configured to execute a process corresponding to the command content read by the reading unit, for the access data specified by the data specifying unit.

According to a fourth aspect of the invention, there is provided a system control program product for causing a computer system to execute procedures for controlling a communication system used in a state where the communication system is connected to a network, including: an accessing unit that accesses a Web page through the network; an extracting unit that extracts access data from the Web page accessed by the accessing unit in order to use the access data for accessing access destination pages accessible through the Web page; a printing unit that prints an image of the Web page accessed by the accessing unit, together with an entry column and a specific code, on a printing medium, the entry column being provided for making a user enter a command content to the access data extracted by the extracting unit, the specific code being provided for specifying correspondence of the entry column to the access data; a reading unit that reads the command content entered in the entry column in the printing medium and the specific code from the printing medium printed by the printing unit; a specifying unit that specifies the access data corresponding to the entry column having the command content read by the reading unit, on the basis of the specific code read together with the command content; and an executing unit that executes a process corresponding to the command content read by the reading unit, for the access data specified by the specifying unit.

According to a fifth aspect of the invention, there is provided a terminal control program product for causing a computer system to execute procedures for controlling a communication terminal used in a state where the communication terminal is connected to a network, including: an accessing unit that accesses a Web page through the network; an extracting unit that extracts access data from the Web page accessed by the accessing unit in order to use the access data for accessing access destination pages accessible through the Web page; and a printing unit that prints an image of the Web page accessed by the accessing unit, together with an entry column and a specific code on a printing medium, the entry column being provided for making a user enter a command content to the access data extracted by the extracting unit, the specific code being provided for specifying correspondence of the entry column to the access data.

According to a sixth aspect of the invention, there is provided a terminal control program product for causing a computer system to execute procedures for controlling a communication terminal used in a state where the communication terminal is connected to a network, including: a reading unit that reads a command content entered in an entry column of a printing medium and a specific code from the printing medium on which an image of a Web page is printed together with the entry column and the specific code, the entry column being provided for making a user to enter the command content for requesting a process for access data for accessing access destination pages accessible through the Web page, the specific code being provided for specifying correspondence of the entry column to the access data; a specifying unit that specifies the access data corresponding to the entry column having the command content read by the reading unit, on the basis of the specific code read together with the command content; and an executing unit that executes a process corresponding to the command content read by the reading unit, for the access data specified by the specifying unit.

BRIEF DESCRIPTION OF THE DRAWINGS

These and other objects and advantages of the present invention will become more fully apparent from the following detailed description taken with the accompanying drawings, in which:

FIG. 3 is a view showing a data structure of a link list;

FIG. 6B is a view showing an image indicated by print data of type 4.

DETAILED DESCRIPTION OF THE PREFERRED EMBODIMENTS

Figure 1:
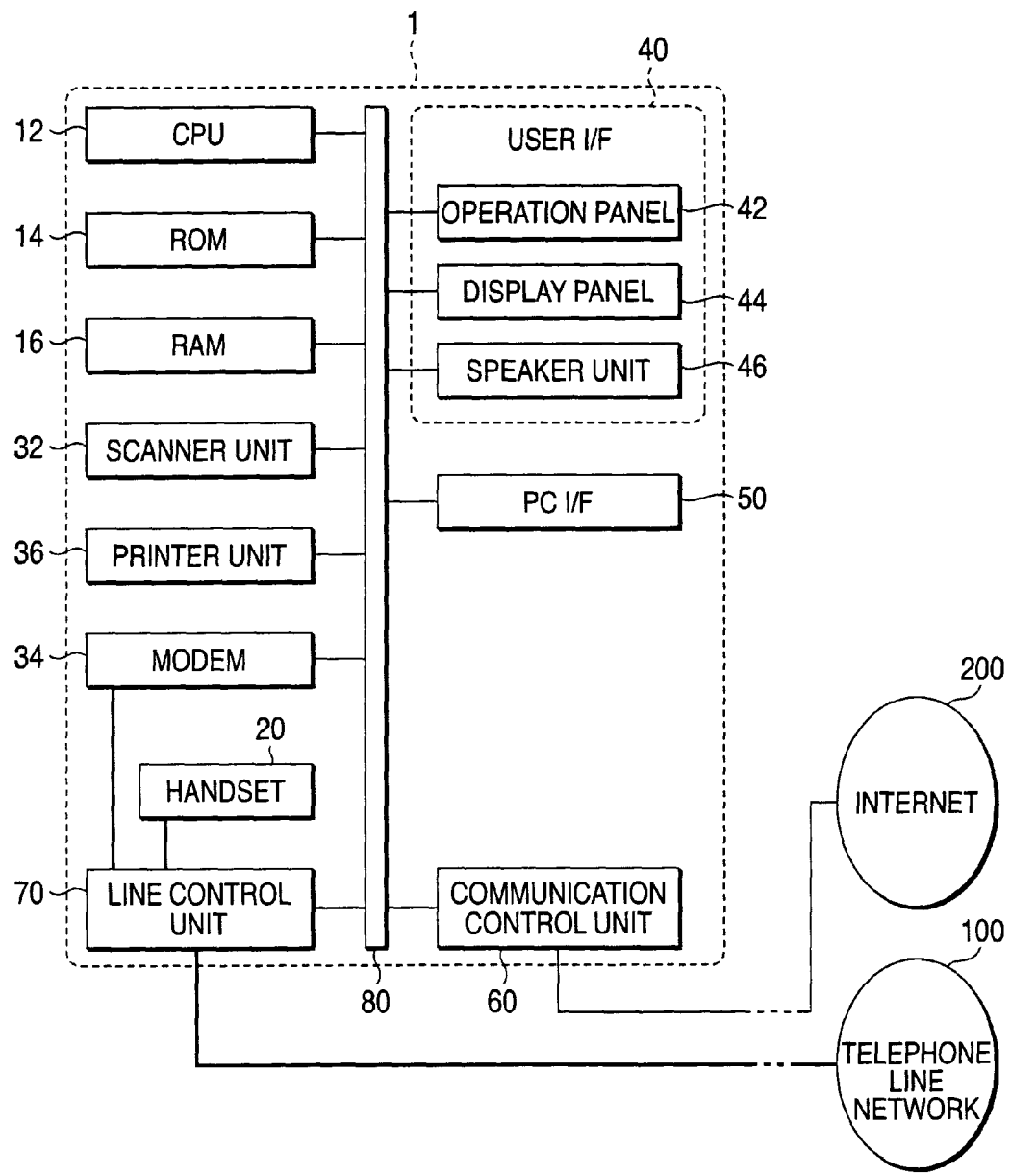
FIG. 1 is a block diagram showing a control system of a communication system according to an embodiment of the invention.

Hereinafter, prior to describing a preferred embodiment of the invention, various aspects of the invention will be described.

(1) The communication system according to one aspect of the invention is a communication system used in a state where the communication system is connected to a network. First, an access unit accesses a Web page through the network. Then, a data extraction unit extracts access data from the Web page accessed by the access unit in order to use the access data for accessing access destination pages accessible through the Web page. Then, a printing unit prints an image of the Web page accessed by the access unit, together with an entry column and a specific code, on a printing medium, the entry column being provided for making a user enter a command content to the access data extracted by the data extraction unit, the specific code being provided for specifying correspondence of the entry column to the access data.

In the above described communication system, a reading unit reads the command content entered in the entry column of the printing medium and the specific code from the printing medium printed by the printing unit. Then, a data specifying unit specifies the access data corresponding to the entry column having the command content read by the reading unit, on the basis of the specific code read together with the command content. Then, a process execution unit executes a process corresponding to the command content read by the reading unit, for the access data specified by the data specifying unit.

According to the communication system configured as described above, the printing unit prints an image of the Web page accessed by the access unit, together with the entry column and the specific code, on a printing medium. Then, while the printing medium on which the command content has been entered in the entry column is read by the reading unit, the process execution unit executes a plurality of processes corresponding to the command content read by the reading unit, for the access data corresponding to the entry column read together with the command content. In this manner, some processing can be executed for the access data contained in the Web page when the printing medium is read after a user enters the command content in the entry column printed together with the image of the Web page on the printing medium while the Web page is browsed through the printing medium.

Particularly, because the process execution unit executes a plurality of processes corresponding to the command content read by the reading unit for the access data, the processes to be executed for the access data can be changed when the command content entered in the entry column by the user are changed.

Incidentally, the access unit is a unit for accessing a Web page through the network, that is, a unit for performing a process of requesting a server connected through the network to send the Web page and of receiving the Web page sent from the server in response of the request. Here, the "network" may be a WAN (Wide Area Network) such as the Internet or may be an LAN (Local Area Network).

The reading unit is a unit for reading the command content entered in the entry column in the printing medium and the specific code from the printing medium. For example, the reading unit may be formed so that after the whole image of the printing medium is read, the command content of the entry column and the specific code contained in the image are extracted to thereby read the command content and the specific code. If the positions (regions) of the entry column and the specific code in the printing medium can be specified, the reading unit may be formed so that the command content of the entry column and the specific code are read selectively and directly.

The process execution unit is a unit for executing processes corresponding to the command content read by the reading unit, for the access data specified by the data specifying unit. For example, as a process to be executed by the process execution unit, a process of printing an access destination page may be considered.

(2) The communication system may be configured so that when the command content read by the reading unit is a request to print an access destination page, the process execution unit instructs the access unit to access the access destination page on the basis of the access data and then instructs the printing unit to print the access destination page accessed by the access unit.

According to the communication system configured as described above, when the command content read by the reading unit is a request to print an access destination page, the process of printing the access destination page can be provided by the process execution unit. Accordingly, after the command content for giving a request to print an access destination page is entered in a corresponding entry column in a printing medium by the user, the printing medium can be read by the reading unit so that the access destination page can be printed.

(3) According to the invention, the communication system may be also configured so that when the command content read by the reading unit is a request to print a specific region of an access destination page, the process execution unit instructs the access unit to access the access destination page on the basis of the access data and then instructs the printing unit to print the specific region of the access destination page accessed by the access unit.

According to the communication system configured as described above, when the command content read by the reading unit is a request to print a specific region of an access destination page, the process of printing the specific region of the access destination page can be provided by the process execution unit. Accordingly, after the command content for giving a request to print a specific region of an access destination page is entered in a corresponding entry column on a printing medium by the user, the printing medium can be read by the reading unit so that the specific region of the access destination page can be printed.

As a process to be executed by the process execution unit, a process of recording the access data may be considered.

(4) To provide the process of recording the access data, the communication system may be configured so that the communication system further includes a data recording unit for recording various pieces of data, wherein when the command content read by the reading unit is a request to record the access data, the process execution unit instructs the data recording unit to record the access data.

According to the communication system configured as described above, when the command content read by the reading unit is a request to record the access data, the process of instructing the data recording unit record the access data can be provided by the process execution unit. Accordingly, after the command content for giving a request to record the access data is entered in a corresponding entry column on a printing medium by the user, the printing medium can be read by the reading unit so that the access data can be recorded by the data recording unit.

As a process to be executed by the process execution unit, a process of recording (storing) an access destination page as data (file) may be considered.

(5) The communication system may be configured so that the communication system further includes a data recording unit for recording various pieces of data, wherein when the command content read by the reading unit is a request to record an access destination page as data, the process execution unit instructs the access unit to access the access destination page on the basis of the access data and then instructs the data recording unit to record the access destination page accessed by the access unit as data.

According to the communication system configured as described above, when the command content read by the reading unit is a request to record an access destination page as data, the process of instructing the data recording unit record the access destination page as data can be provided by the process execution unit. Accordingly, after the command content for giving a request to record the access destination page as data is entered in a corresponding entry column on a printing medium by the user, the printing medium can be read by the reading unit so that the access destination page can be recorded as data by the data recording unit.

Incidentally, the printing unit may be configured so as to print an entry column for making a user enter characters, symbols or graphics indicating the command content are printed according to the access data. In this case, the reading unit may be configured so that characters, symbols or graphics entered in the entry column are read while recognized as command contents.

The printing unit may be configured so as to print an entry column in which command contents for the access data are decided on the basis of entry positions of each entry column for access data. In this case, the reading unit may be formed so that the entry positions of the entry column are read as command contents corresponding to the positions. According to this configuration, because command contents can be specified on the basis of the entry positions of the entry column, the user needs to do nothing but entering some sign in (checking off) each required entry column. That is, it is unnecessary to enter characters, symbols or graphics as specific command contents. Accordingly, labor required for entering the command contents in the entry column can be reduced. Furthermore, since the reading unit need not perform a complex process of recognizing and reading characters, symbols or graphics entered in the entry column as command contents so that only accuracy enough to read the entry positions in the entry column is required of the reading unit, there is an expectation that the reading unit can be provided simply and inexpensively. Incidentally, in order to read entry positions in the entry column, for example, each entry column may be composed of a plurality of check columns arranged along a predetermined direction so that the check columns can be read successively along the direction of arrangement of the check columns. In this manner, when a check column having a command content entered (checked off) is detected, the entry position in each entry column can be read (specified) on the basis of the sequence of the check columns.

The following configuration may be considered as a configuration in which the printing unit prints the entry column according to the access data so that command contents of the entry column for the access data are decided on the basis of the entry positions and the reading unit reads the entry positions of the entry column as described above.

(6) As for one configuration in the communication system according to the invention, the printing unit prints the entry column in which the command contents to the access data are decided according to entry positions of the entry column. The reading unit reads the entry positions of the entry column in the printing medium together with the specific code from the printing medium printed by the printing unit. Then, the process execution unit executes processes corresponding to the entry positions read by the reading unit in the plurality of processes, for the access data specified by the data specifying unit.

According to the communication system configured as described above, the entry column in which command contents to the access data have been decided on the basis of the entry positions can be printed according to the access data by the printing unit, so that the entry positions of the entry column can be read by the reading unit.

The printing unit may be formed so that character strings indicating access data corresponding to the entry column are printed as the specific code in positions adjacent to the entry column respectively. In this case, the data specifying unit may be formed so that character strings which are the specific code are specified as access data corresponding to the entry column.

(7) As a more specific configuration, the communication system according to the invention may be formed so that the printing unit prints character strings indicating the access data extracted by the data extraction unit, as the specific code, and when specific code read together with command contents by the reading unit are character strings indicating the access data, the data specifying unit specifies the access data indicated by the character strings, as the access data corresponding to the entry column having the command contents read.

According to the communication system configured as described above, character strings indicating the access data extracted by the data extraction unit can be printed as the specific code by the printing unit. Accordingly, the character strings printed as the specific code by the printing unit can be specified as the access data corresponding to the entry column by the data specifying unit.

When printing is performed by the printing unit, the communication system may be configured as follows.

(8) The communication system according to the invention may further include a data recording unit for recording various pieces of data, and an associative record instruction unit for instructing the data recording unit to record associative data indicating correspondence of the access data extracted by the data extraction unit to the entry column printed by the printing unit, wherein: the printing unit prints first specific code indicating that the access data corresponding to the entry column can be specified on the basis of the associative data recorded by the data recording unit, as the specific code; and when specific code read together with command contents by the reading unit are the first specific code, the data specifying unit specifies the access data corresponding to the entry column on the basis of the associative data recorded by the data recording unit.

According to the communication system configured as described above, the associative record instruction unit can instruct the data recording unit to record associative data indicating correspondence of the access data to the entry column. Accordingly, the printing unit can print the first specific code as the specific code, and the data specifying unit can specify access data corresponding to the entry column on the basis of the associative data recorded by the data recording unit.

Particularly, the first specific code printed by the printing unit have only one function of indicating that access data corresponding to the entry column can be specified on the basis of the associative data recorded by the data recording unit. Accordingly, because the number of characters in all specific code can be reduced compared with the case where character strings indicating access data are printed as the specific code, there is an expectation that the percentage occupied by the region required for printing the specific code in the printing medium can be reduced.

Incidentally, when a plurality of Web pages need to be accessed by the access unit, the communication system may be configured as follows.

(9) The communication system according to the invention may be configured so that the associative record instruction unit instructs the data recording unit to record a plurality of the associative data different according to Web pages accessed by the access unit. Further, the printing unit prints the first specific code indicating that the access data corresponding to the entry column can be specified on the basis of specific associative data in the plurality of associative data recorded by the data recording unit. When specific code read together with command contents by the reading unit are the first specific code, the data specifying unit specifies the access data corresponding to the entry column on the basis of the specific associative data in the plurality of associative data recorded by the data recording unit.

According to the communication system configured as described above, the associative record instruction unit can instruct the data recording unit to record associative data different according to Web pages accessed by the access unit. In this manner, the plurality of associative data according to Web pages can be recorded by the data recording unit. Because the printing unit prints the first specific code indicating that access data corresponding to the entry column can be specified on the basis of specific associative data, the data specifying unit can specify access data corresponding to the entry column on the basis of the specific associative data in the plurality of associative data recorded by the data recording unit.

Incidentally, the term "first specific code" means codes indicating that access data corresponding to the entry column can be specified on the basis of specific associative data. For example, the first specific code are codes containing path names indicating recording places of specific associative data in the data recording unit, and characters or symbols by which the path names can be specified.

When printing is performed by the printing unit, the communication system may be configured as follows.

(10) The communication system according to the invention may further include a data recording unit for recording various pieces of data, and an access record instruction unit for instructing the data recording unit to record the access data of the Web page accessed by the access unit, wherein: the printing unit prints second specific code indicating that the access data corresponding to the entry column can be extracted from a specific region of a Web page accessible on the basis of the access data recorded by the data recording unit, as the specific code; and when specific code read together with command contents by the reading unit are the second specific code, the data specifying unit instructs the access unit to access the Web page based on the access data recorded by the data recording unit, instructs the data extraction unit to extract access data from the specific region of the Web page accessed by the access unit and specifies the access data extracted by the data extraction unit as the access data corresponding to the entry column having the command contents read.

According to the communication system configured as described above, the access record instruction unit can instruct the data recording unit to record the access data of the Web page accessed by the access unit. Further, the second specific code can be printed as the specific code by the printing unit, so that the access data recorded by the data recording unit can be specified as access data corresponding to the entry column by the data specifying unit.

Particularly, the second specific code printed by the printing unit have only one function of indicating that access data corresponding to the entry column can be extracted from a specific region of a Web page accessible on the basis of the access data recorded by the data recording unit. Accordingly, because the number of characters in all specific code can be reduced compared with the case where character strings indicating access data are printed as the specific code, there is an expectation that the percentage occupied by the region required for printing the specific code on the printing medium can be reduced.

Incidentally, when a plurality of Web pages need to be accessed by the access unit, a plurality of access data are recorded by the data recording unit. In this case, the communication system may be configured as follows.

(11) The communication system according to the invention may be configured so that the access record instruction unit instructs the data recording unit to record a plurality of access data of Web pages accessed by the access unit. Further, the printing unit prints the second specific code indicating that access data corresponding to the entry column can be extracted from a specific region of a Web page accessible on the basis of specific access data in the plurality of access data recorded by the data recording unit. When specific code read together with command contents by the reading unit are the second specific code, the data specifying unit specifies the access data extracted by the data extraction unit from the Web page accessed on the basis of the specific access data in the plurality of access data recorded by the data recording unit, as the access data corresponding to the entry column.

According to the communication system configured as described above, even in the case where a plurality of Web pages are accessed by the access unit, the access record instruction unit can instruct the data recording unit to record a plurality of access data corresponding to the Web pages. Because the printing unit prints the second specific code indicating that access data corresponding to the entry column can be extracted from a specific region of a Web page accessible on the basis of specific access data, the data specifying unit can specify the access data extracted from the Web page accessed on the basis of the specific access data by the data extraction unit, as access data corresponding to the entry column.

Incidentally, the term "second specific code" means codes indicating that access data corresponding to the entry column can be extracted from a specific region of a Web page accessible on the basis of specific access data. For example, the second specific code are codes containing path names indicating recording places of specific access data in the data recording unit, and characters or symbols by which the path names can be specified.

When printing is performed by the printing unit, the communication system may be configured as follows.

(12) In the communication system according to the invention, the printing unit may print access data of the Web page accessed by the access unit and third specific code indicating that access data corresponding to the entry column can be extracted from a specific region of the Web page accessed by the access unit, as the specific code. When specific code read together with command contents by the reading unit are the third specific code, the data specifying unit instructs the access unit to access the Web page based on the access data indicated by the third specific code, instructs the data extraction unit to extract access data from the specific region of the Web page accessed by the access unit and specifies the access data extracted by the data extraction unit as access data corresponding to the entry column having the command contents read.

According to the communication system configured as described above, the printing unit can print access data and third specific code as the specific code. Further, the data specifying unit can specify access data extracted from a specific region of a Web page of the access data indicated by the third specific code, as access data corresponding to the entry column.

Particularly, the third specific code printed as the specific code by the printing unit may indicate access data of the Web page accessed by the access unit and have only one function of indicating that access data corresponding to the entry column can be extracted from a specific region of the Web page accessed by the access unit. Accordingly, because the number of characters in all specific code can be reduced compared with the case where character strings indicating access data are printed as specific code according to the entry column, there is an expectation that the percentage occupied by the region required for printing the specific code on the printing medium can be reduced.

(13) According to another aspect of the invention, there is provided a communication terminal used in a state where the communication terminal is connected to a network, including: an access unit for accessing a Web page through the network; a data extraction unit for extracting access data from the Web page accessed by the access unit in order to use the access data for accessing access destination pages accessible through the Web page; and a printing unit for printing an image of the Web page accessed by the access unit, entry column and specific code on a printing medium, the entry column being provided for making a user to enter a command content to the access data extracted by the data extraction unit, the specific code being provided for specifying correspondence of the entry column to the access data.

The communication terminal configured as described above can form part of the communication system according to the invention defined in any one of (1) to (5). In the communication system having the communication terminal as part, the same function and advantage as those of the communication system according to the invention defined in any one of (1) to (5) can be obtained. Particularly, if the printing unit prints the entry column in which command contents to access data have been decided on the basis of entry positions, the communication terminal can form part of the communication system according to the invention defined in (6). In the communication system having the communication terminal as part, the same function and advantage as those of the communication system according to the invention defined in (6) can be obtained.

(14) The communication terminal according to the invention may be configured so that the printing unit prints character strings indicating the access data extracted by the data extraction unit, as the specific code. In this case, the communication terminal can form part of the communication system according to the invention defined in (7). In the communication system having the communication terminal as part, the same function and advantage as those of the communication system according to the invention defined in (7) can be obtained.

(15) The communication terminal according to the invention and with the configuration defined in (13) or (14) may be configured as follows. That is, the communication terminal further includes: a data recording unit for recording various pieces of data; and an access record instruction unit for instructing the data recording unit to record the access data of the Web page accessed by the access unit, wherein the printing unit prints second specific code indicating that the access data corresponding to the entry column can be extracted from a specific region of a Web page accessible on the basis of the access data recorded by the data recording unit, as the specific code.

The communication terminal configured as described above can form part of the communication system according to the invention defined in (10). In the communication system having the communication terminal as part, the same function and advantage as those of the communication system according to the invention defined in (10) can be obtained.

(16) The communication terminal according to the invention and with the configuration defined in (15) may be configured so that the printing unit prints the second specific code indicating that the access data corresponding to the entry column can be extracted from a specific region of specific access data in the access data recorded by the data recording unit.

The communication terminal configured as described above can form part of the communication system according to the invention defined in (11). In the communication system having the communication terminal as part, the same function and advantage as those of the communication system according to the invention defined in (11) can be obtained.

(17) The communication terminal according to the invention and with the configuration defined in any one of (13) to (16) may be configured so that the printing unit prints third specific code indicating that the access data of the Web page accessed by the access unit and the access data corresponding to the entry column can be extracted from a specific region of the Web page accessed by the access unit, as the specific code.

The communication terminal configured as described above can form part of the communication system according to the invention defined in (12). In the communication system having the communication terminal as part, the same function and advantage as those of the communication system according to the invention defined in (12) can be obtained.

(18) According to another aspect of the invention, there is provided a communication terminal used in a state where the communication terminal is connected to a network, including: a reading unit for reading a command content entered in an entry column in a recording medium and a specific code from the recording medium on which an image of a Web page is printed together with the entry column and the specific code, the entry column being provided for making a user enter the command content to access data for accessing access destination pages accessible through the Web page, the specific code being provided for specifying correspondence of the entry column to the access data; a data specifying unit for specifying the access data corresponding to the entry column having the command content read by the reading unit, on the basis of the specific code read together with the command content; and a process execution unit for executing a plurality of processes corresponding to the command content read by the reading unit, for the access data specified by the data specifying unit.

The communication terminal configured as described above can form part of the communication system according to the invention defined in (1). In the communication system having the communication terminal as part, the same function and advantage as those of the communication system according to the invention defined in (1) can be obtained.

(19) The communication terminal according to the invention may be configured as follows. That is, the communication terminal further includes: an access unit for accessing a Web page through the network; and a printing unit for printing an image of the Web page accessed by the access unit, on a printing medium, wherein when a command content read by the reading unit is a request to print an access destination page, the process execution unit instructs the access unit to access the access destination page based on the access data and then instructs the printing unit to print the access destination page accessed by the access unit.

The communication terminal configured as described above can form part of the communication system according to the invention defined in (2). In the communication system having the communication terminal as part, the same function and advantage as those of the communication system according to the invention defined in (2) can be obtained.

(20) The communication terminal according to the invention may be configured so that when a command content read by the reading unit is a request to print a specific region of an access destination page, the process execution unit instructs the access unit to access the access destination page based on the access data and then instructs the printing unit to print the specific region of the access destination page accessed by the access unit.

The communication terminal configured as described above can form part of the communication system according to the invention defined in (3). In the communication system having the communication terminal as part, the same function and advantage as those of the communication system according to the invention defined in (3) can be obtained.

(21) The communication terminal according to the invention and with the configuration defined in any one of (18) to (20) may be configured as follows. That is, the communication terminal further includes a data recording unit for recording various pieces of data, wherein when a command content read by the reading unit is a request to record access data, the process execution unit instructs the data recording unit to record the access data.

The communication terminal configured as described above can form part of the communication system according to the invention defined in (4). In the communication system having the communication terminal as part, the same function and advantage as those of the communication system according to the invention defined in (4) can be obtained.

(22) The communication terminal according to the invention and with the configuration defined in any one of (19) to (21) may be configured as follows. That is, the communication terminal further includes a data recording unit for recording various pieces of data, wherein when a command content read by the reading unit is a request to record an access destination page as data, the process execution unit instructs the access unit to access the access destination page based on the access data and then instructs the data recording unit to record the access destination page accessed by the access unit as data.

The communication terminal configured as described above can form part of the communication system according to the invention defined in (5). In the communication system having the communication terminal as part, the same function and advantage as those of the communication system according to the invention defined in (5) can be obtained.

(23) The communication terminal according to the invention and with the configuration defined in any one of (18) to (22) may be configured so that the reading unit reads entry positions of the entry column in the printing medium and the specific code from the reading medium; and the process execution unit executes processes corresponding to the entry positions read by the reading unit, for the access data specified by the data specifying unit.

The communication terminal configured as described above can form part of the communication system according to the invention defined in (6). In the communication system having the communication terminal as part, the same function and advantage as those of the communication system according to the invention defined in (6) can be obtained.

(24) The communication terminal according the invention and with the configuration defined in any one of (18) to (23) may be configured so that when specific code read together with the command content by the reading unit are character strings indicating the access data, the data specifying unit specifies the access data indicated by the character strings as the access data corresponding to the entry column having the command content read.

The communication terminal configured as described above can form part of the communication system according to the invention defined in (7). In the communication system having the communication terminal as part, the same function and advantage as those of the communication system according to the invention defined in (7) can be obtained.

(25) The communication terminal according to the invention and with the configuration defined in any one of (19) to (24) may be configured so that when specific code read together with the command content by the reading unit are third specific code indicating that the access data of a specific Web page and the access data corresponding to the entry column can be extracted from a specific region of the specific Web page, the data specifying unit instructs the access unit to access the specific Web page based on the access data indicated by the third specific code, instructs the data extraction unit to extract access data from the specific region of the specific Web page accessed by the access unit and specifies the access data extracted by the data extraction unit as the access data corresponding to the entry column having the command content read.

The communication terminal configured as described above can form part of the communication system according to the invention defined in (12). In the communication system having the communication terminal as part, the same function and advantage as those of the communication system according to the invention defined in (12) can be obtained.

(26) According to another aspect of the invention, there is provided a system control program for causing a computer system to execute various kinds of procedures for controlling a communication system used in a state where the communication system is connected to a network, including: an access procedure for accessing a Web page through the network; a data extraction procedure for extracting access data from the Web page accessed in the access procedure in order to use the access data for accessing access destination pages accessible through the Web page; a printing procedure for printing an image of the Web page accessed by the access unit, together with an entry column and a specific code on a printing medium, the entry column being provided for making a user enter a command content to the access data extracted in the data extraction procedure, the specific code being provided for specifying correspondence of the entry column to the access data, on a printing medium; a reading procedure for reading the command content entered in the entry column in the printing medium and the specific code from the printing medium printed in the printing procedure; a data specifying procedure for specifying the access data corresponding to the entry column having the command content read in the reading procedure, on the basis of the specific code read together with the command content; and a process execution procedure for executing a process corresponding to the command content read in the reading procedure, for the access data specified in the data specifying procedure.

The computer system controlled by such a program can form part of the communication system according to the invention defined in (1). Accordingly, in the communication system having the computer system as part, the same function and advantage as those of the communication system according to the invention defined in (1) can be obtained.

The program may be provided as a program in which the process execution procedure is carried out in the same manner as in the process execution unit according to the invention defined in (2) so that an access destination page based on access data is accessed in the access procedure and then the accessed access destination page is printed in the printing procedure. In this case, the computer system can form part of the communication system according to the invention defined in (2). Accordingly, in the communication system having the computer system as part, the same function and advantage as those of the communication system according to the invention defined in (2) can be obtained.

The system control program according to the invention defined in (26) maybe also provided as a program in which the process execution procedure is carried out in the same manner as in the process execution unit according to the invention defined in (3) so that an access destination page based on access data is accessed in the access procedure and then a specific region of the accessed access destination page is printed in the printing procedure. In this case, the computer system can form part of the communication system according to the invention defined in (3). Accordingly, in the communication system having the computer system as part, the same function and advantage as those of the communication system according to the invention defined in (3) can be obtained.

In a case where the communication system has a data recording unit for recording various pieces of data, the system control program according to the invention defined in (26) may be also provided as a program in which the process execution procedure is carried out in the same manner as in the process execution unit according to the invention defined in (4) so that the access data is recorded by the data recording unit. In this case, the computer system can form part of the communication system according to the invention defined in (4). Accordingly, in the communication system having the computer system as part, the same function and advantage as those of the communication system according to the invention defined in (4) can be obtained.

In a case where the communication system has a data recording unit for recording various pieces of data, the system control program product according to the invention defined in (26) may be also provided as a program product in which the process execution procedure is carried out in the same manner as in the process execution unit according to the invention defined in (5) so that an access destination page based on access data is accessed in the access procedure and then the accessed access destination page is recorded as data by the data recording unit. In this case, the computer system can form part of the communication system according to the invention defined in (5). Accordingly, in the communication system having the computer system as part, the same function and advantage as those of the communication system according to the invention defined in (5) can be obtained.

The system control program product according to the invention defined in (26) may be also provided as a program product in which the procedures are carried out in the same manner as in the respective units according to the invention defined in (6) so that entry column in which command contents to access data are decided on the basis of entry positions are printed in the printing procedure, the entry positions of the entry column in the printing medium and the specific code are read in the reading procedure from the printing medium printed in the printing procedure, and processes corresponding to the entry positions read in the reading procedure in a plurality of processes are executed in the process execution procedure for the access data specified in the data specifying procedure. In this case, the computer system can form part of the communication system according to the invention defined in (6). Accordingly, in the communication system having the computer system as part, the same function and advantage as those of the communication system according to the invention defined in (6) can be obtained.

The system control program product according to the invention defined in (26) may be also provided as a program product in which the procedures are carried out in the same manner as in the respective units according to the invention defined in (7) so that the character strings indicating access data extracted in the data extraction procedure are printed in printing procedure as specific code, and the access data indicated by the character strings are specified in the data specifying procedure as access data corresponding to the entry column having the command contents read. In this case, the computer system can form part of the communication system according to the invention defined in (7). Accordingly, in the communication system having the computer system as part, the same function and advantage as those of the communication system according to the invention defined in (7) can be obtained.

In a case where the communication system has a data recording unit for recording various pieces of data, the system control program product according to the invention defined in (26) may be provided as a program product which includes an associative record instruction procedure for instructing the data recording unit to record associative data indicating correspondence of the access data extracted in the data extraction procedure to the entry column printed in the printing procedure and in which the procedures are executed in the same manner as in the respective units according to the invention defined in (8) so that first specific code are printed in the printing procedure as the specific code and access data corresponding to the entry column are specified in the data specifying procedure on the basis of the associative data recorded by the data recording unit. In this case, the computer system can form part of the communication system according to the invention defined in (8). Accordingly, in the communication system having the computer system as part, the same function and advantage as those of the communication system according to the invention defined in (8) can be obtained.

The system control program product may be also provided as a program in which the procedures are executed in the same manner as in the respective units according to the invention defined in (9) so that in the associative record instruction procedure, the data recording unit is instructed to record associative data different according to Web pages accessed in the access procedure; in the printing procedure, first codes are printed; and in the data specifying procedure, access data corresponding to the entry column are specified on the basis of specific associative data in the associative data recorded by the data recording unit. In this case, the computer system can form part of the communication system according to the invention defined in (9). Accordingly, in the communication system having the computer system as part, the same function and advantage as those of the communication system according to the invention defined in (9) can be obtained.

In a case where the communication system has a data recording unit for recording various pieces of data, the system control program product according to the invention defined in (26) may be provided as a program product which includes an access record instruction procedure for instructing the data recording unit to record access data of a Web page accessed in the access procedure and in which the procedures are executed in the same manner as in the respective units according to the invention defined in (10) or (11) so that second specific code are printed in the printing procedure as the specific code, and access data extracted in the data extraction procedure from a specific region of the Web page accessed in the access procedure on the basis of the access data recorded by the data recording unit is specified in the data specifying procedure as access data corresponding to the entry column having command contents read. In this case, the computer system can form part of the communication system according to the invention defined in (10) or (11). Accordingly, in the communication system having the computer system as part, the same function and advantage as those of the communication system according to the invention defined in (10) or (11) can be obtained.

The system control program product according to the invention defined in (26) may be provided as a program product in which the procedures are executed in the same manner as in the respective units according to the invention defined in (12) so that access data of a Web page accessed in the access procedure and third specific code are printed in the printing procedure as the specific code, and access data extracted in the data extraction procedure from a specific region of the Web page accessed in the access procedure on the basis of the access data indicated by the third specific code are specified in the data specifying procedure as access data corresponding to the entry column having command contents read. In this case, the computer system can form part of the communication system according to the invention defined in (12). Accordingly, in the communication system having the computer system as part, the same function and advantage as those of the communication system according to the invention defined in (12) can be obtained.

Incidentally, the system control program products are provided to the communication system per se, the computer system or the user of these systems through a recording medium such as an FD, a CD-ROM or a memory card or through a communication line network such as the Internet. Examples of the computer system used for executing these system control programs include a computer system built in the communication system, and a computer system connected to the communication system wirelessly or with a fixed communication line so that data communication can be made.

(27) According to another aspect of the invention, there is provided a terminal control program product for making a computer system execute various kinds of procedures for controlling a communication terminal used in a state where the communication terminal is connected to a network, including: an access procedure for accessing a Web page through the network; a data extraction procedure for extracting access data from the Web page accessed in the access procedure in order to use the access data for accessing access destination pages accessible through the Web page; and a printing procedure for printing an image of the Web page accessed by the access unit, together with an entry column and a specific code on a printing medium, the entry column being provided for making a user enter a command content to the access data extracted in the data extraction procedure, the specific code being provided for specifying correspondence of the entry column to the access data.

The computer system controlled by the program can form part of the communication terminal according to the invention defined in (13). Accordingly, in the communication terminal having the computer system as part, the same function and advantage as those of the communication system according to the invention defined in (13) can be obtained.

The terminal control program product may be provided as a program product in which character strings indicating access data extracted in the data extraction procedure are printed as the specific code in the printing procedure in the same manner as the printing unit according to the invention defined in (14). In this case, the computer system can form part of the communication terminal according to the invention defined in (14). Accordingly, in the communication terminal having the computer system as part, the same function and advantage as those of the communication terminal according to the invention defined in (14) can be obtained.

In a case where the communication terminal has a data recording unit for recording various pieces of data, the terminal control program product according to the invention defined in (27) may be provided as a program product which includes an access record instruction procedure for instructing the data recording unit to record access data of a Web page accessed in the access procedure and in which second specific code are printed as the specific code in the printing procedure in the same manner as in the printing unit according to the invention defined in (15) or (16). In this case, the computer system can form part of the communication terminal according to the invention defined in (15) or (16). Accordingly, in the communication terminal having the computer system as part, the same function and advantage as those of the communication terminal according to the invention defined in (15) or (16) can be obtained.

The terminal control program product according to the invention defined in (27) may be provided as a program product in which third specific code are printed as the specific code in the printing procedure in the same manner as in the printing unit according to the invention defined in (17). In this case, the computer system can form part of the communication terminal according to the invention defined in (17). Accordingly, in the communication terminal having the computer system as part, the same function and advantage as those of the communication terminal according to the invention defined in (17) can be obtained.

(28) According to another aspect of the invention, there is provided a terminal control program product for making a computer system execute various kinds of procedures for controlling a communication terminal used in a state where the communication terminal is connected to a network, including: a reading procedure for reading a command content entered in an entry column of a printing medium and a specific code from the printing medium on which an image of a Web page is printed together with the entry column and the specific code, the entry column being provided for making a user enter the command content to access data for accessing access destination pages accessible through the Web page, the specific code being provided for specifying correspondence of the entry column to the access data; a data specifying procedure for specifying the access data corresponding to the entry column having the command content read in the reading procedure, on the basis of the specific code read together with the command content; and a process execution procedure for executing a plurality of processes corresponding to the command content read in the reading procedure, for the access data specified in the data specifying procedure.

The computer system controlled by the program product can form part of the communication terminal according to the invention defined in (18). Accordingly, in the communication terminal having the computer system as part, the same function and advantage as those of the communication system according to the invention defined in (18) can be obtained.

The terminal control program product may be provided as a program product which includes an access procedure for accessing a Web page through the network, and a printing procedure for printing an image of the Web page accessed in the access procedure, on a printing medium and in which the procedures are executed in the same manner as in the respective units according to the invention defined in (19) or (20) so that in the process execution procedure, the access procedure is instructed to access an access destination page based on the access data and then the printing procedure is instructed to print the accessed access destination page. In this case, the computer system can form part of the communication terminal according to the invention defined in (19) or (20). Accordingly, in the communication terminal having the computer system as part, the same function and advantage as those of the communication terminal according to the invention defined in (19) or (20) can be obtained.

In a case where the communication terminal has a data recording unit for recording various pieces of data, the terminal control program product according to the invention defined in (28) may be provided as a program product in which the data recording unit is instructed to record access data in the process execution procedure in the same manner as the process execution unit according to the invention defined in (21). In this case, the computer system can form part of the communication terminal according to the invention defined in (21). Accordingly, in the communication terminal having the computer system as part, the same function and advantage as those of the communication terminal according to the invention defined in (21) can be obtained.

In a case where the communication terminal has a data recording unit for recording various pieces of data, the terminal control program product according to the invention defined in (28) may be provided as a program product in which in the process execution procedure, the access procedure is instructed to access an access destination page based on the access data and then the data recording unit is instructed to record the accessed access destination page as data in the same manner as the process execution unit according to the invention defined in (22). In this case, the computer system can form part of the communication terminal according to the invention defined in (22). Accordingly, in the communication terminal having the computer system as part, the same function and advantage as those of the communication terminal the invention defined in (22) can be obtained.

The terminal control program product according to the invention defined in (28) may be provided as a program product in which the procedures are executed in the same manner as in the respective units according to the invention defined in (23) so that in the reading procedure, the entry positions of the entry column in the recording medium and the specific code are read from the recording medium; and in the process execution procedure, processes corresponding to the entry positions read in the reading procedure is executed for the access data specified in the data specifying procedure. In this case, the computer system can form part of the communication terminal according to the invention defined in (23). Accordingly, in the communication terminal having the computer system as part, the same function and advantage as those of the communication terminal according to the invention defined in (23) can be obtained.

The terminal control program product according to the invention defined in (28) may be provided as a program product in which in the data specifying procedure specifies, data indicated by character strings being specific code is specified as access data corresponding to the entry column having command content read in the same manner as in the data specifying unit according to the invention defined in (24). In this case, the computer system can form part of the communication terminal according to the invention defined in (24). Accordingly, in the communication terminal having the computer system as part, the same function and advantage as those of the communication terminal according to the invention defined in (24) can be obtained.

The terminal control program product according to the invention defined in (28) may be provided as a program product which includes an access procedure for accessing a Web page through the network and in which in the data specifying procedure, access data extracted in the data extraction procedure from a specific region of a specific Web page accessed by the access unit on the basis of access data indicated by third specific code is specified as access data corresponding to the entry column having command content read in the same manner as in the data specifying unit according to the invention defined in (25). In this case, the computer system can form part of the communication terminal according to the invention defined in (25). Accordingly, in the communication terminal having the computer system as part, the same function and advantage as those of the communication terminal according to the invention defined in (25) can be obtained.

Incidentally, the terminal control program products are provided to the communication terminal per se, the computer system or the user of the terminal/system through a recording medium such as an FD, a CD-ROM or a memory card or through a communication line network such as the Internet. Examples of the computer system used for executing the terminal control programs include a computer system built in the communication terminal, and a computer system connected to the body of the communication terminal wirelessly or by a fixed communication line so that data communication can be made.

Referring now to the accompanying drawings, a description will be given in detail of a preferred embodiment of the invention.

As for the preferred embodiment, an example of application of the configuration of the invention to a composite machine (multifunction machine) 1 will be described below.

The composite machine 1 has a function for performing data communication through the Internet 200 in addition to a function for providing voice communication through a telephone line network 100 and a function for transmitting/receiving images through the telephone line network 100.

As shown in FIG. 1, the composite machine 1 includes a CPU 12, an ROM 14, an RAM 16, a handset 20, a scanner unit 32, a modem 34, a printer unit 36, a user interface unit (hereinafter referred to as user I/F) 40, a PC interface unit (hereinafter referred to as PC I/F) 50, a communication control unit 60, and a line control unit 70 which are connected to one another through a bus 80.

The CPU 12 controls the operation of the composite machine 1 totally by sending commands to the respective constituent members of the composite machine 1 through the bus 80 while making the RAM 16 store results of processing in accordance with a procedure stored in the ROM 14 in advance. Incidentally, the ROM 14 contains a communication software program for providing a function of accessing a Web page in another procedure than the aforementioned procedure by requesting a server connected to the Internet 200 to send the Web page through the communication control unit 60 and by receiving the Web page transmitted from the server through the communication control unit 60 in response to the request.

The handset 20 is a transmitter-receiver that can be detached from a body of the composite machine 1 when in use.

Upon reception of a command from the CPU 12, the scanner unit 32 reads an image from a sheet of paper set in a predetermined reading position (not shown) and generates image data corresponding to the image.

Upon reception of a command from the CPU 12, the modem 34 generates an image signal transmissible through the telephone line network 100 by modulating the image data generated in the scanner unit 32 or generates image data by demodulating the image signal input through the line control unit 70 from the telephone line network 100.

Upon reception of a command from the CPU 12, the printer unit 36 prints (types) an image on a sheet of paper set in a predetermined paper feed position (not shown).

The user I/F 40 includes an operation panel 42 having a plurality of keys and switches, a display panel 44 for displaying various kinds of information, and a speaker unit 46 having a speaker and a drive circuit for driving the speaker. Of the constituent members of the user I/F 40, the operation panel 42 has a plurality of character keys capable of inputting characters, numbers and symbols, a Web print key for starting printing of a Web page in a Web printing process which will be described later, a mode selection switch for selecting a print mode, and a scan key for starting reading of an image in the scanner unit 32.

The PC I/F 50 is an interface for connecting the composite machine 1 to another computer system through a communication cable. The PC I/F 50 enables data communication between the composite machine 1 and the computer system.

Upon reception of a command from the CPU 12, the communication control unit 60 receives data packet by packet from the outside of the composite machine 1 as input data or sends data packet by packet to the outside of the composite machine 1 as output data.

The line control unit 70 receives a signal (audio/video signal) from the telephone line network 100 as an input signal and sends a signal to the telephone line network 100 as an output signal. Upon reception of a command from the CPU 12, the line control unit 70 sets a transmission path for a destination and a source of the input/output signal between the line control unit 70 and the telephone line network 100. When an operation (off-hook operation) of detaching the handset 20 from the body of the composite machine 1 is carried out, a path from the line control unit 70 to the handset 20 is set as the "transmission path for a destination and a source of the input/output signal between the line control unit 70 and the telephone line network 100". The transmission path set thus is cancelled when an operation (on-hook operation) of returning the handset 20 to the body of the composite machine 1 is carried out. When an operation of sending an image (through FAX transmission) is carried out by the operation panel 42 of the user I/F 40 or when a video signal is received, a path to the modem 34 is set as the transmission path. The transmission path set thus is cancelled when transmission of the video signal from the modem 34 or reception of the video signal from the telephone line network 100 is completed.

Incidentally, though detailed description will be omitted, a part of a telephone line for connecting the line control unit 70 to the telephone line network 100 is used also as a part (a section of from the user side to the telephone office side) of the transmission path from the communication control unit 60 to the Internet 200 in the composite machine 1. In this section, a signal transmitted through the telephone line network 100 and packet data transmitted through the Internet 200 are transmitted while superposed on each other by ADSL (Asymmetric Digital Subscriber Line) technology.

[Web Printing Process by CPU 12]

The Web printing process executed by the CPU 12 included in the composite machine 1 will be described below with reference to FIG. 2. The Web printing process is started when the Web print key is pushed down after an operation of designating a URL (Uniform Resource Locator) of a Web page (an operation of entering a URL by character keys) is performed by the operation panel 42.

First, the CPU 12 accesses the Web page of the URL designated by the operation panel 42 (S110). In the step S110, the CPU 12 requests sending of the Web page of the URL designated by the operation panel 42 and receives the Web page sent from a server in response to the request to thereby access the Web page of the URL designated by the operation panel 42.

Then, the CPU 12 generates a link list for the Web page accessed in the step S110 (S120). The "link list" is a list in which the URL of the Web page (hereinafter referred to as access source page) accessed in the step S110 and URLs of Web pages (hereinafter referred to as access destination pages) capable of being further accessed from the access source page are arranged as shown in FIG. 3. In the step S120, first, a link list is generated so that the URL of the access source page designated by the operation panel 42 is registered in the link list so as to be associated with number "0". Then, URLs of access destination pages and access destination information are extracted from source data (expressed in text data) of the access source page. Specifically, while contents of the access source page described in HTML (Hyper-Text Makeup Language) are scanned successively, specific units (units of "XXXX" generally described as URLs) in anchor tags (<a href="XXXX">YYYY</a> in which "XXXX" and "YYYY" are arbitrary character strings) and character strings (units of "YYYY") enclosed in the anchor tags are extracted successively as URLs of access destination pages and access destination information. The extracted URLs and access destination information are registered in the link list so as to be associated with numbers expressed as extracted numbers. Incidentally, the link list is generated in a memory region of the RAM 16 allocated for generating the link list.

Then, the CPU 12 checks whether the printing mode is a "space-saving mode" or not (S130). The "printing mode" indicates whether the percentage occupied by the entry column and code region in the whole image is to be reduced or not when print data of the image obtained by addition of the entry column and code region to the image of the access source page is generated in the following step. The "printing mode" is set by the mode selection switch of the operation panel 42. In the step S130, a decision is made that the printing mode is a "space-saving mode" when the mode selection switch is turned to the space-saving mode side (ON side), and a decision is made that the printing mode is a "normal mode" when the mode selection switch is turned to the normal mode side (OFF side).

Figure 4:
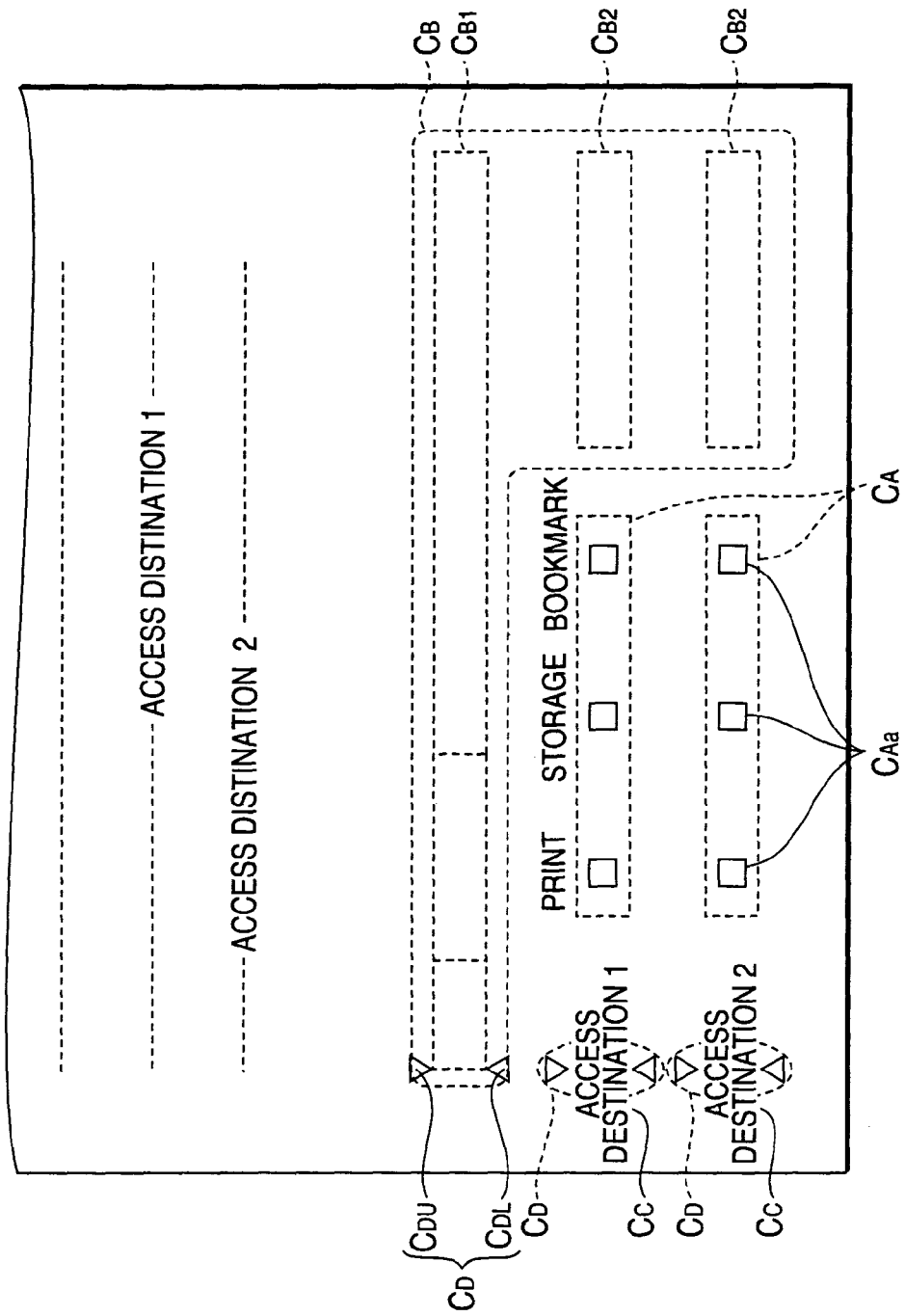
FIG. 4 is a view showing an image indicated by print data.

Print data in the invention will be described here. Print data contains data of the image of the access source page, and image data of an image added to a lower end of the image of the access source page as shown in FIG. 4. The image data of the added image further contains entry columns $C_A$ for making the user enter contents of commands to the URLs of the access destination pages, a code region $C_B$ for entering specific codes for specifying correspondence of the entry columns $C_A$ to the URLs, and access destination information $C_C$.

Among these data, the entry columns $C_A$ are provided according to the access destination pages. Each of the entry columns $C_A$ is composed of a plurality of check columns $C_{Aa}$ arranged horizontally (laterally in FIG. 4). These check columns $C_{Aa}$ are associated with different command contents (such as print, storage and bookmark registration in the invention) respectively. When, for example, the inside of a quadrangle forming a check column $C_{Aa}$ is marked (checked off) with "v" or "/", a command content corresponding to the check column $C_{Aa}$ can be entered in an entry column $C_A$. In this manner, command contents in each entry column $C_A$ are decided on the basis of the check-off positions (entry positions) respectively. Access destination information $C_C$ of an access destination page is arranged on the left of each entry column $C_A$. The access destination information $C_C$ is mainly output so that access can be identified by the user. The code region $C_B$ contains a first code region $C_{B1}$ arranged above the entry columns $C_A$ for entering a code indicating a method for specifying URLs corresponding to the entry columns $C_A$, and second code regions $C_{B2}$ arranged on the right of the entry columns A respectively for entering codes for specifying URLs corresponding to the entry columns $C_A$. In this manner, the entry columns $C_A$ and the second code regions $C_{B2}$ are arranged according to the access destination information $C_C$ so that a pair of an entry column $C_A$ and a second code region $C_{B2}$ forms a data record used in Web command processing (FIG. 7) which will be described later. A pair of position identification signs $C_D$ (an upper end sign $C_{DU}$ indicated by downward triangle; and a lower end sign $C_{DL}$ indicated by upward triangle) for identifying upper and lower end positions in the print data are arranged at a left end of the first code region b1 or each data record. When a plurality of pages are required as a result of printing based on the access source page, access destination pages appearing as part of the access source page printed on the page of the data record and information concerning the access destination pages are selectively printed.

Figure 5A:
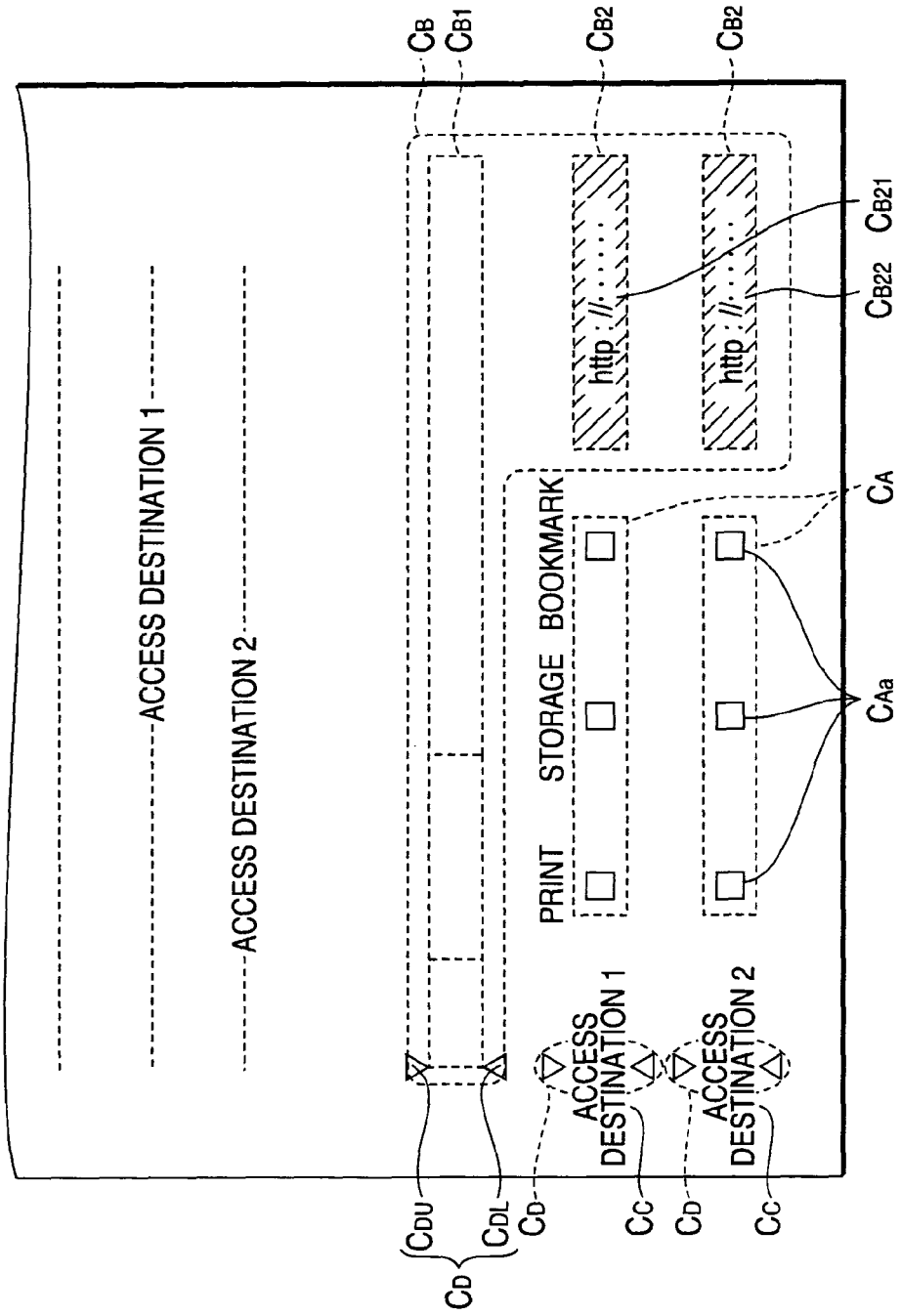
FIG. 5A is a view showing an image indicated by print data of type 1.

Then, when the printing mode selected in the step S130 is a "normal mode" (S130: NO), the CPU 12 generates print data of type 1 (S140). In the step S140, print data of an image as shown in FIG. 5A is generated as the print data of type 1. That is, there is no data entered in the first code region $C_{B1}$. Entry columns $C_A$ are provided according to the access destination information $C_C$ registered in the link list generated in the step S120. Character strings $C_{B21}$ indicating URLs corresponding to the access destination information $C_C$ registered in the link list are entered in the second code regions $C_{B2}$ respectively. The print data of type 1 is generated so that a URL entered in each second code region $C_{B2}$ is written on a plurality of lines if the URL is long. Accordingly, as the URL entered in each second code region $C_{B2}$ becomes long, the percentage occupied by a corresponding pair of an entry column $C_A$ and a code region $C_B$ in the whole image becomes large.

When the printing mode selected in the step S130 is a "space-saving mode" (S130: YES), the CPU 12 checks whether the memory region allocated for recording the link list remains sufficiently in the RAM 16 or not (S150). In the step S150, a decision is made that the memory region allocated for recording the link list remains sufficiently if the remaining amount of the memory region is not smaller than 50%, and a decision is made that the memory region allocated for recording the link list does not remain sufficiently if the remaining amount of the memory region is smaller than 50%.

When making a decision in the step S150 that the memory region remains sufficiently (S150: YES), the CPU 12 records the link list generated in the step S120 in the memory region for recording the link list (S160). In the step S160, the link list generated in the step S120 is recorded as a filename including serial number (e.g., a filename LIST0001 including a serial number "0001") in the memory region. Specifically, when a link list from a filename (LIST0001) including a serial number "0001" to a filename (LIST0010) including a serial number "0010" has been already recorded in the memory region, the link list generated in the step S120 is recorded as a filename (LIST0011) including a serial number "0011" in the step S160.

Figure 5B:
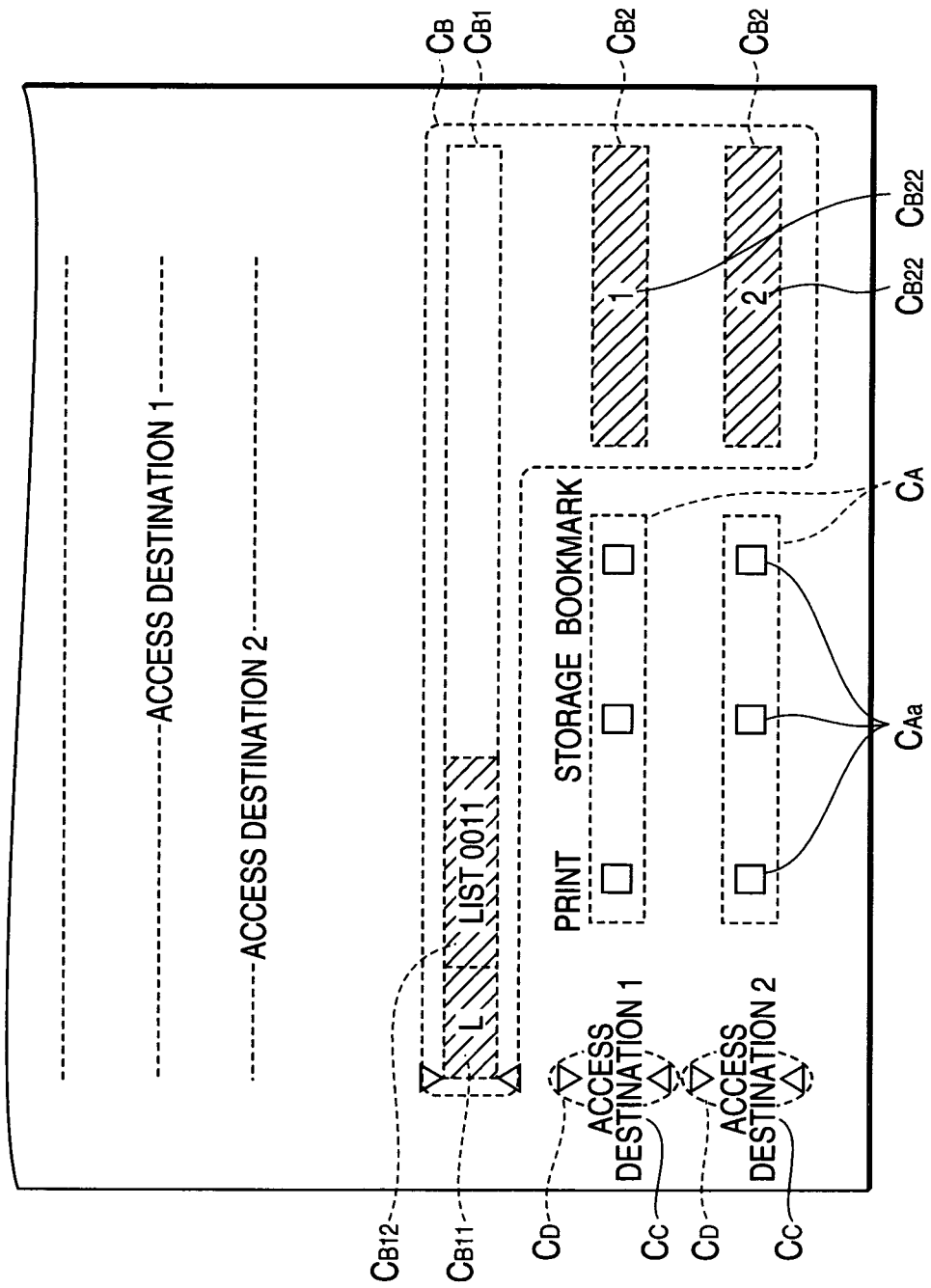
FIG. 5B is a view showing an image indicated by print data of type 2.

Then, the CPU 12 generates print data of type 2 (S170). In the step S170, print data of an image as shown in FIG. 5B is generated as the print data of type 2. That is, a symbol $C_{B11}$ (see "L" in FIG. 5B) indicating use of the link list recorded in the step S160 as a method for specifying URLs corresponding to the entry columns $C_A$ and a character string $C_{B12}$ indicating the filename of the link list recorded in the step S160 are written in the first code region $C_{B1}$. The entry columns $C_A$ are provided according to the access destination information $C_C$ registered in the link list generated in the step S120. Numbers $C_{B22}$ corresponding to the access destination information $C_C$ registered in the link list are written in the second code regions $C_{B2}$ respectively. In the print data of type 2, there is no URL written in the second code regions $C_{B2}$. Accordingly, there is an expectation that the percentage occupied by the entry columns $C_A$ and the code region $C_B$ in the whole image can be reduced (i.e., space can be saved) compared with the print data of type 1 in which URLs are written in the second code regions $C_{B2}$ respectively.

When making a decision in the step S150 that the memory region does not remain sufficiently (S150: NO), the CPU 12 checks whether the memory region remains slightly or not at all (S180). In the step S180, a decision is made that the memory region allocated for recording the link list remains slightly if the remaining amount of the memory region is not smaller than 5%, and a decision is made that the memory region allocated for recording the link list does not remain at all if the remaining region of the memory region is smaller than 5%.

When making a decision in the step S180 that the memory region remains slightly (S180: YES), the CPU 12 records a text file indicating the URL of the access source page (the URL designated by the operation panel 42 at the time of start of the Web printing) in the memory region for recording the link list (S190). In the step S190, the URL of the access source page is recorded as a filename including a serial number (e.g., a filename URL-0001 including a serial number "0001") in the memory region. Specifically, when a link list from a filename (URL-0001) including a serial number "0001" to a filename (URL-0010) including a serial number "0010" has been already recorded in the memory region, a text file indicating the URL of the access source page is recorded as a filename (URL-0011) including a serial number "0011" in the step S190.

Figure 6A:
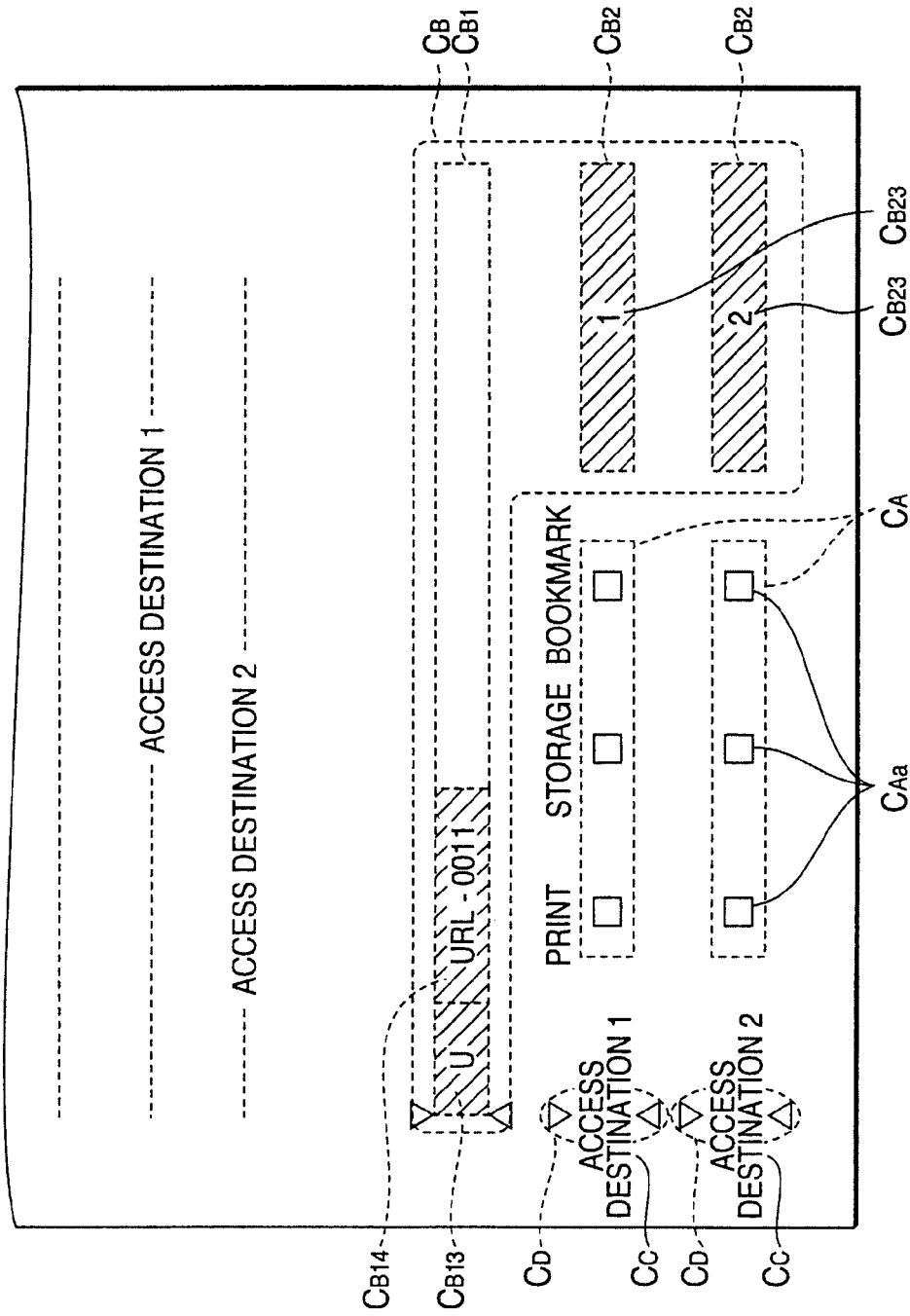
FIG. 6A is a view showing an image indicated by print data of type 3.

Then, the CPU 12 generates print data of type 3 (S200). In the step S200, print data of an image as shown in FIG. 6A is generated as the print data of type 3. That is, a symbol $C_{B13}$ (see "U" in FIG. 6A) indicating use of the text file recorded in the step S190 as a method for specifying URLs corresponding to the entry columns $C_A$ and a character string $C_{B14}$ indicating the filename of the text file recorded in the step S190 are written in the first code region $C_{B1}$. The entry columns $C_A$ are provided according to the access destination information $C_C$ registered in the link list generated in the step S120. Numbers $C_{B23}$ corresponding to the access destination information $C_C$ registered in the link list are written in the second code regions $C_{B2}$ respectively. In the print data of type 3, there is an expectation that the percentage occupied by the entry columns $C_A$ and the code region $C_B$ in the whole image can be reduced (i.e., space can be saved) in the same manner as in the print data of type 2 compared with the print data of type 1.

When making a decision in the step S180 that the memory region does not remain at all (S180: NO), the CPU 12 generates print data of type 4 (S210). In the step S210, print data of an image as shown in FIG. 6B is generated as the print data of type 4. That is, a symbol $C_{B15}$ (see "O" in FIG. 6B) indicating use of the access source page as a method for specifying URLs corresponding to the entry columns $C_A$ and a character string $C_{B16}$ indicating the URL of the access source page (the URL designated by the operation panel 42 at the time of start of the Web printing) are written in the first code region $C_{B1}$. The entry columns $C_A$ are provided according to the access destination information $C_C$ registered in the link list generated in the step S120. Numbers $C_{B24}$ corresponding to the access destination information $C_C$ registered in the link list are written in the second code regions $C_{B2}$ respectively. In the print data of type 4, there is an expectation that the percentage occupied by the entry columns $C_A$ and the code region $C_B$ in the whole image can be reduced (i.e., space can be saved) in the same manner as in the print data of type 2 or 3 compared with the print data of type 1.

Incidentally, when the print data of type 3 is generated in the step S200 or when the print data of type 4 is generated in the step S210, the link list generated in the step S120 is not recorded in the RAM 16.

After the step S140, S170, S200 or S210, the CPU 12 gives an instruction to print an image indicated by the print data generated in the step S140, S170, S200 or S210 on a sheet of paper (S220). In the step S220, the CPU 12 instructs the printer unit 36 to print the print data generated in the step S140, S170, S200 or S210, so that an image of the print data generated in the step S140, S170, S200 or S210 is printed on a sheet of paper (see FIGS. 5A and 5B and FIGS. 6A and 6B)

[Web Command Processing by CPU 12]

Web command processing executed by the CPU 12 included in the composite machine 1 will be described below with reference to FIG. 7. The Web command processing is started when the scan key of the operation panel 42 is pushed down in the condition that the sheet of paper printed by the Web printing process (FIG. 2) is set in a predetermined reading position.

First, the CPU 12 initializes variable N (S310). In the step S310, "1" is set in the variable N (N=1). Incidentally, "n" which will be described later is a value set in the variable N.

Then, the CPU 12 initializes the memory region of the RAM 16 allocated for generating the link list (S320).

First, the CPU 12 gives an instruction to read the image from the sheet of paper (S330). In the step S330, the CPU 12 instructs the scanner unit 32 to read the image from the sheet of paper, so that the image is read from the sheet of paper.

Then, the CPU 12 extracts an image of a region corresponding to the first code region $C_{B1}$ from the image read in the step S330 (S340). In the step S340, the image read in the step S330 is scanned vertically (downward in FIGS. 5A and 5B and FIGS. 6A and 6B), so that a region of the position identification sign $C_D$ (between $C_{DU}$ and $C_{DL}$) detected first is extracted as an image of a region corresponding to the first code region $C_{B1}$.

Then, the CPU 12 checks, on the basis of the image extracted in the step S340, whether the image read in the step S330 is an image based on the print data of type 1 or not (S350). In the step S350, the image of the first code region $C_{B1}$ extracted in the step S340 is scanned horizontally (rightward in FIGS. 5A and 5B and FIGS. 6A and 6B) to perform a process (OCR: Optical Character Recognition) of recognizing characters written in this region. If characters including a specific code cannot be read from the first code region b1 as a result of the process, the image is recognized as an image based on the print data of type 1. If a symbol $C_{B11}$ (see "L" in FIG. 5B) is read as a specific code, the image is recognized as an image based on the print data of type 2. If a symbol $C_{B13}$ (see "U" in FIG. 6A) is read as a specific code, the image is recognized as an image based on the print data of type 3. If a sign $C_{B16}$ (see "O" in FIG. 6B) is read as a specific code, the image is recognized as an image based on the print data of type 4.

When making a decision in the step S350 that the image read in the step S330 is not an image based on the print data of type 1 (S350: NO), the CPU 12 reads the link list from the link list-recording memory region in the RAM 16 (S370) if the image is an image based on the print data of type 2 (S360: YES). In the step S370, a process of recognizing characters written in the first code region $C_{B1}$ is carried out in the same manner as in the step S350, so that a link list having the same filename as the character string $C_{B12}$ read together with the symbol $C_{B11}$ is read from the link list-recording memory region and copied (expanded) on the link list-generating memory region in the RAM 116.

When making a decision in the step S350 that the image read in the step S330 is an image based on the print data of type 3 (S360: NO, S380: YES), the CPU 12 reads a text file from the link list-recording memory region in the RAM 16 (S390). In the step S390, a process of recognizing characters written in the first code region $C_{B1}$ is carried out in the same manner as in the step S350, so that a text file having the same filename as the character string $C_{B14}$ read together with the symbol $C_{B13}$ is read from the link list-recording memory region.

When making a decision in the step S350 that the image read in the step S330 is an image based on the print data of type 4 (S360: NO, S380: NO), the CPU 12 carries out a process of recognizing characters written in the first code region $C_{B1}$ in the same manner as in the step S350, so that the character string $C_{B16}$ read together with the symbol $C_{B15}$ is recognized as the URL of the access source page (S400).

After completion of the step S400 or S390, the CPU 12 accesses a Web page of the URL indicated by the text file read in the step S390 or of the URL recognized in the step S400 (S410). In the step S410, the CPU 12 makes a request to send the Web page of the URL and receives the Web page sent in response of the request to thereby access the Web page in the same manner as in the step S110 in FIG. 2.

Then, the CPU 12 generates a link list corresponding to the Web page accessed in the step S410 (S420). The step S420 is the same as the step S120 in FIG. 2. In the step S420, a link list is generated in the memory region of the RAM 16 allocated for generating the link list.

After the step S420 is completed, after the link list is read in the step S370 or when the image read in the step S330 is an image based on the print data of type 1 (S350: YES), the CPU 12 extracts an image corresponding to the n-th data record (S430). In the step S430, the image read in the step S330 is scanned vertically (downward in FIGS. 5A and 5B and FIGS. 6A and 6B) so that the region of the position identification sign $C_D$ (between $C_{DU}$ and $C_{DL}$) detected in the (n+1)-th order is extracted as an image of a region corresponding to the n-th data record (the entry column $C_A$ and the second code region $C_{B2}$ in the n-th access destination information $C_C$).

Then, the CPU 12 checks whether the entry column $C_A$ for the image corresponding to the n-th data record extracted in the step S430 is marked or not (S440). In the step S440, the image of the n-th data record extracted in the step S430 is scanned in order of arrangement of the check columns $C_{Aa}$ (rightward in FIGS. 5A and 5B and FIGS. 6A and 6B). When any one of the check columns $C_{Aa}$ is marked, a decision is made that a check column $C_{Aa}$ in the order (first to third) is marked. Incidentally, in the step S440, all the check columns $C_{Aa}$ constituting the entry column $C_A$ are examined.

When making a decision in the step S440 that the entry column $C_A$ is marked (S440: YES), the CPU 12 specifies a URL of an access destination page corresponding to the entry column $C_A$ (S450). In the step S450, when a decision is made in the step S350 that the image is recognized as an image based on the print data of type 1, the image of the n-th data record is first scanned horizontally in the same manner as in the step S440 so that the character string $C_{B21}$ written in the region is recognized. The character string $C_{B21}$ recognized thus is specified as the URL of the access destination page. When the image is recognized to be not an image based on the print data of type 1, the image of the n-th data record is scanned horizontally in the same manner as in the step S430 so that the number $C_{B22}$, $C_{B23}$ or $C_{B24}$ written in the region is recognized. Then, a URL corresponding to the recognized number $C_{B22}$, $C_{B23}$ or $C_{B24}$ is extracted from the link list copied or generated in the link list-generating memory region, so that the extracted URL is specified as the URL of the access destination page.

Then, the CPU 12 specifies command content to the URL specified in the step S450 (S460). In the step S460, the command content to the URL is specified on the basis of the check column $C_A$, judged in the step S440 to be marked. When, for example, a decision is made in the step S440 that the first check column $C_A$ is marked, printing the access destination page is specified as the command content. When a decision is made in the step S440 that the second check column $C_{Aa}$ is marked, recording (storing) the access destination page as data (file) is specified as the command content. When a decision is made in the step S440 that the third check column $C_{Aa}$ is marked, bookmark registration of the access destination page is specified as the command content.

Incidentally, in the step S460, when a decision is made in the step S440 that a plurality of check columns $C_{Aa}$ are marked, a plurality of command contents corresponding to the check columns $C_{Aa}$, are specified.

Then, the CPU 12 executes a process indicated by the command content specified in the step S460 for the URL specified in the step S450 (S470). In the step S470, when, for example, printing the access destination page is specified as the command content in the step S460, the access destination page of the URL specified in the step S450 is accessed in the same manner as in the step S410 and an instruction is given to the printer unit 36 to print the access destination page accessed thus. In this manner, the image of the access destination page is printed. When recording the access destination page as data is specified as the command content in the step S460, the access destination page of the URL specified in the step S450 in the same manner as in the step S400 is accessed and data of the access destination page accessed thus is recorded in the Web page-recording memory region in the RAM 16. When bookmark registration of the access destination page is specified as the command content in the step S460, the URL specified in the step S440 is recorded in the bookmark memory region in the RAM 16. The URL recorded thus in the bookmark memory region can be displayed together with other recorded URLs on the display panel 44 by the operation of the operation panel 42. When the user pushes down the Web print key after carrying out an operation of designating a URL through the operation panel 42, the Web printing process shown in FIG. 2 can be started.

Incidentally, in the step S470, when a plurality of command contents are specified in the step S460, all processes indicated by the command contents respectively are carried out.

After completion of the step S470 or when making a decision in the step S440 that the entry column $C_A$ is not marked (S440: NO), the CPU 12 adds "1" to a variable N (N=n+1) (S480).

Then, the CPU 12 checks whether the n-th data record is present or not (S490). In the step S490, the image read in the step S330 is scanned vertically in the same manner as in the step S430. When the (n+1)-th position identification sign $C_D$ is detected, a decision is made in the step S490 that the n-th data record is present.

When making a decision in the step S490 that the n-th data record is present (S490: YES), the CPU 12 returns to the step S430. When a decision is made in the step S490 that the n-th data record is absent (S490: NO), the Web command processing is terminated.

[Correlation with the Invention]

In the embodiment described above, the composite machine 1 is a communication system and communication terminal in the invention, the RAM 16 is a data recording unit in the invention, and the communication software program incorporated in the ROM 14 is an access unit in the invention.

Figure 2:
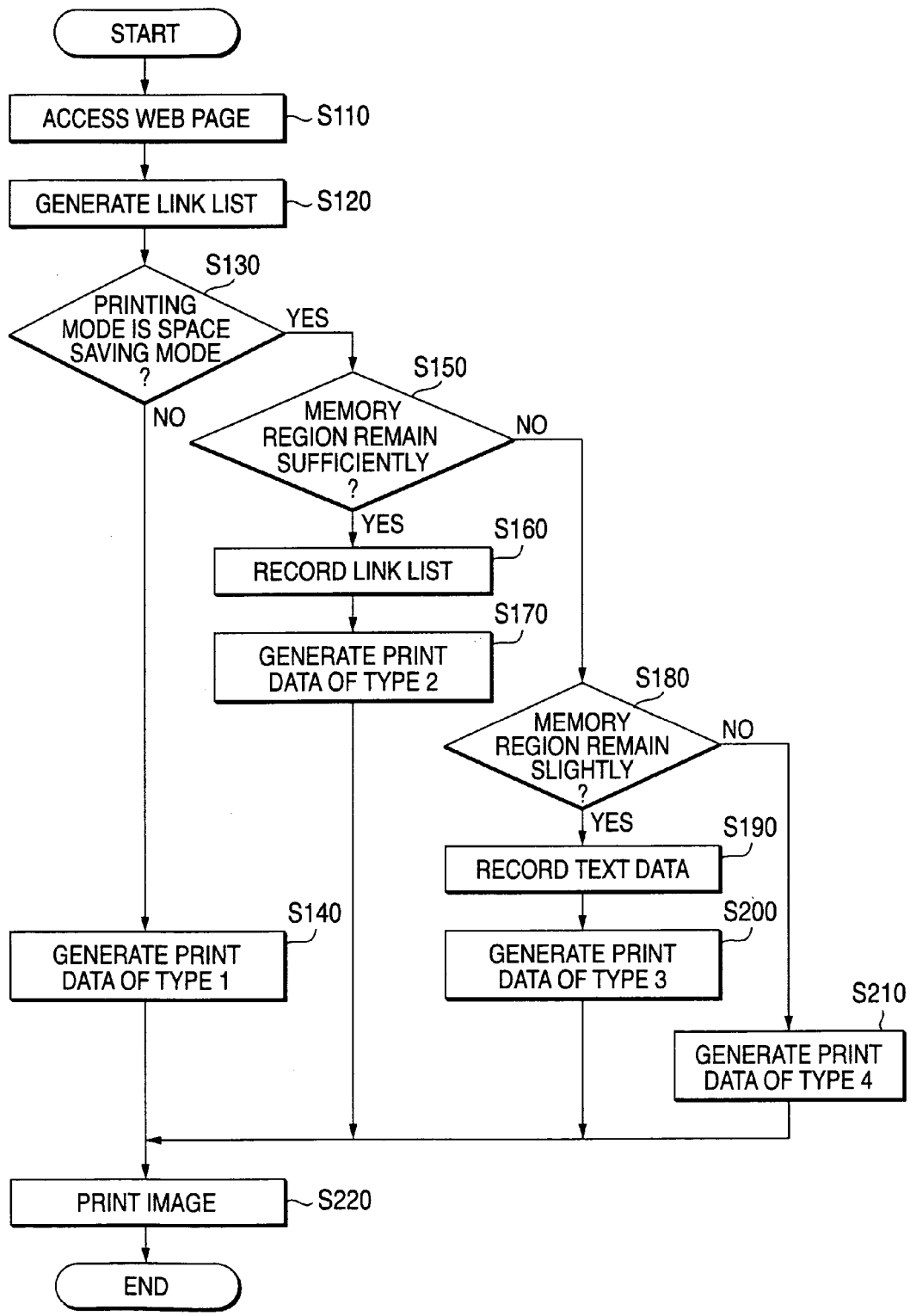
FIG. 2 is a flow chart showing a procedure of a Web printing process.
Figure 7:
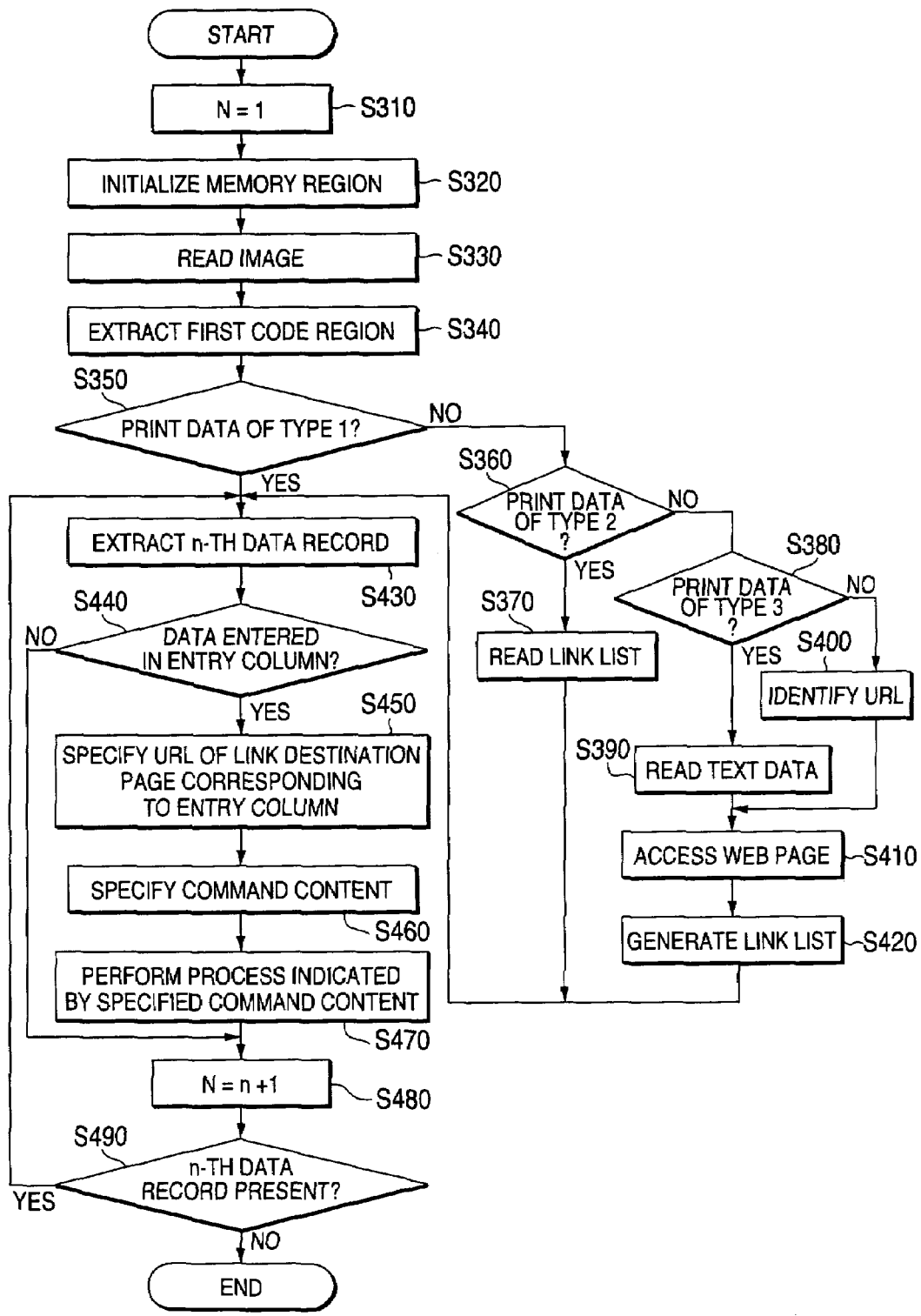
FIG. 7 is a flow chart showing a procedure of a Web command process.

In the step S120 in FIG. 2 or in the step S420 in FIG. 7, a URL of an access destination page is extracted from the access source page when a link list is generated. A configuration for providing this step is a data extraction unit in the invention.

In each of the steps S140, S170, S200, S210 and S220 in FIG. 2, print data of each type is generated so that an image indicated by the print data is printed. The steps and the printer unit 36 form a printing unit in the invention.

In each of the steps S330 to S460 in FIG. 7, command contents entered in the entry columns $C_A$ and specific codes entered in the code region $C_B$ are read. These steps and the scanner unit 32 form a reading unit in the invention.

In FIG. 7, the step S450 forms a data specifying unit in the invention and the step S470 forms a process execution unit in the invention.

The link list is associative data in the invention. The step S160 of instructing the RAM 16 to record the link list forms an associative record instruction unit in the invention.

The URL of a Web page is access data in the invention. The step S190 in FIG. 2 for instructing the RAM 16 to record text data indicating the URL forms an access record instruction unit in the invention.

The symbol $C_{B11}$, the character string $C_{B12}$ and the numbers $C_{B22}$ entered in the code region $C_B$ of the image expressed by print data of type 2 indicate that URLs of access destination pages corresponding to the entry columns $C_A$ can be specified on the basis of the link list. The symbol $C_{B11}$, the character string $C_{B12}$ and the numbers $C_{B22}$ are first specific codes in the invention.

The symbol $C_{B13}$, the character string $C_{B14}$ and the numbers $C_{B23}$ entered in the code region $C_B$ of the image expressed by print data of type 3 indicate that URLs of access destination pages corresponding to the entry columns $C_A$ can be extracted from a specific region (anchor tags written in the access source page in the order of the numbers $C_{B23}$) of a Web page (access source page) of the URL indicated by a text file of the same name as the character string $C_{B14}$. The symbol $C_{B13}$, the character string $C_{B14}$ and the numbers $C_{B23}$ are second specific codes in the invention.

The symbol $C_{B15}$, the character string $C_{B16}$ and the numbers $C_{B24}$ entered in the code region $C_B$ of the image expressed by print data of type 4 indicate that URLs of access destination pages corresponding to the entry columns $C_A$ can be extracted from a specific region (anchor tags written in the access source page in the order of the numbers $C_{B24}$) of a Web page (access source page) of the URL indicated by the character string $C_{B16}$. The symbol $C_{B15}$, the character string $C_{B16}$ and the numbers $C_{B24}$ are third specific codes in the invention.

[Advantage of the Invention]

According to the composite machine 1 configured as described above, in the step S220 in FIG. 2, the image of the Web page accessed in the step S110 is printed together with the entry columns $C_A$ and the code region $C_B$ on a sheet of paper. The sheet of paper in which command contents have been entered in the entry columns $C_A$ is read in the Web command process shown in FIG. 7, so that in the step S470, processes corresponding to the command contents specified in the step S460 can be executed for the URL specified in the step S450. The command contents specified in the step S460 are specified on the basis of the contents (command contents) entered in the entry columns $C_A$. The URL specified in the step S450 is specified on the content entered in the code region $C_B$. In this manner, when a Web page is browsed through a sheet of paper, the sheet of paper can be read by the scanner unit 32 of the composite machine 1 after the user enters contents in the entry columns $C_A$ printed together with the image of the Web page on the sheet of paper, so that some process can be applied to an access destination page accessible through the Web page or the URL of the access destination page.

Particularly in the step S460 in FIG. 7, command contents are specified on the basis of contents entered the entry columns $C_A$, so that processes corresponding to the command contents are executed in the step S470. Accordingly, the processes to be executed for the URL specified in the step S450 can be changed when the contents entered in the entry columns $C_A$ by the user are changed. a request to print an access destination page, a process of printing When a command content specified in the step S460 in FIG. 7 is the access destination page can be executed in the step S470. Accordingly, the access destination page can be printed when the sheet of paper is read by the composite machine 1 (in the step S330 et seq. in FIG. 7) after the user marks (checks off) a check column $C_{Aa}$ corresponding to the command content to print the access destination page in a corresponding entry column $C_A$ on the sheet of paper.

When a command content specified in the step S460 in FIG. 7 is a request to record an access destination page as data, a process of recording the access destination page as data can be executed in the step S470. Accordingly, the access destination page can be recorded as data when the sheet of paper is read by the composite machine 1 (in the step S330 et seq. in FIG. 7) after the user marks (checks off) a check column $C_{Aa}$ corresponding to the command content to record the access destination page as data in a corresponding entry column $C_A$ on the sheet of paper.

When a command content specified in the step S460 in FIG. 7 is a request to make bookmark registration of an access destination page, a process of making bookmark registration of the access destination page can be executed in the step S470. Accordingly, bookmark registration of the access destination page can be made when the sheet of paper is read by the composite machine 1 (in the step S330 et seq. in FIG. 7) after the user marks (checks off) a check column $C_{Aa}$ corresponding to the command content to make bookmark registration of the access destination page in a corresponding entry column $C_A$ on the sheet of paper.

Each of the entry columns $C_A$ as part of the image indicated by print data generated by the Web printing process shown in FIG. 2 has a plurality of check columns $C_{Aa}$ arranged along the widthwise direction, so that command contents are decided on the basis of entry positions of the entry column $C_A$. In the step S440 in FIG. 7, each entry column $C_A$ is scanned successively along the direction of arrangement of the check columns $C_{Aa}$ to thereby check whether each check column $C_{Aa}$ is checked off or not. In this manner, because command contents can be specified on the entry positions (check columns $C_{Aa}$ checked off) of the entry columns $C_A$ in the step S440, the user does not have to enter characters, symbols or graphics as specific command contents but simply has to check off check columns $C_{Aa}$ corresponding to the required command contents with a certain sign (e.g., "v" or "/") in the entry columns $C_A$. Accordingly, labor required for entering command contents in the entry columns $C_A$ can be reduced. In the step S330 et seq., it is unnecessary to carry out a complex process of recognizing characters, symbols or graphics entered in the entry columns $C_A$ as command contents if there is accuracy enough to read (specify) the entry positions (check columns $C_{Aa}$ checked off) of the entry columns $C_A$. Accordingly, the configuration concerning the step S330 et seq. can be provided simply and inexpensively.

In the step S220 in FIG. 2, entry columns $C_A$ in which command contents to URLs of access destination pages are decided on the basis of the entry positions (the positions of check columns $C_{Aa}$) can be printed according to the access destination pages. In the step S330 et seq. in FIG. 7, the check columns $C_{Aa}$ can be scanned successively in the direction of arrangement of the check columns $C_{Aa}$ to thereby read (specify) the entry positions (check columns $C_{Aa}$ checked off) of the entry columns $C_A$.

In the step S140 in FIG. 2, print data (of type 1) is generated so that character strings $C_{B21}$ indicating URLs of access destination pages are written as specific codes in the second code regions $C_{B2}$. An image indicated by the print data is printed in the step S220. Accordingly, in the step S450 in FIG. 7, the character strings $C_{B21}$ printed as specific codes on the sheet of paper can be specified as URLs of access destination pages corresponding to the entry columns $C_A$.

In the step S110 in FIG. 2, a link list is generated so that URLs of access destination pages and access destination information are registered in the link list while associated with numbers indicating a sequence of extraction from the access source page. The link list can be recorded in the RAM 16 in the step S160. Then, in the step S170, print data (of type 2) is generated so that the symbol $C_{B11}$ indicating use of the link list and the character string $C_{B12}$ indicating the filename of the link list are written in the first code region $C_{B1}$ while the numbers $C_{B22}$ corresponding to the access destination information $C_C$ registered in the link list are written in the second code regions $C_{B2}$ respectively. An image expressed by the print data is printed in the step S220. Accordingly, in the step S450 in FIG. 7, URLs of access destination pages corresponding to the entry columns $C_A$ can be specified on the basis of the link list of the filename read as one of the link lists recorded in the RAM 16 from the first code region $C_{B1}$ and the numbers read from the second code regions $C_{B2}$.

Particularly in the print data generated in the step S170, if the code region $C_B$ which is part of the image expressed by the print data can indicate that URLs of access destination pages corresponding to the entry columns $C_A$ can be specified on the basis of the link list, there is an expectation that the number of characters in all specific codes can be reduced compared with the case where URLs are directly written as specific codes. Accordingly, the percentage occupied by the code region $C_B$ in the whole image can be reduced.

In the step S160 in FIG. 2, the link list is recorded, as a filename including a serial number, in the RAM 16. Accordingly, link lists corresponding to a plurality of access source files can be recorded so that the link lists can be specified on the basis of filenames respectively. In the step S170, print data expressing an image is generated so that the symbol $C_{B11}$ indicating that URLs of access destination pages corresponding to the entry columns $C_A$ can be specified on the basis of the link list and the character string $C_{B12}$ indicating the filename of the link list are written in the code region $C_B$. The image expressed by the print data is printed in the step S220. Accordingly, in the step S450 in FIG. 7, URLs of access destination pages corresponding to the entry columns $C_A$ can be specified on the basis of the link list of the same filename as the character string $C_{B12}$ written in the code region $C_B$.

In the step S190 in FIG. 2, a text file indicating the URL of the access source page can be recorded in the RAM 16. In the step S200, print data (of type 3) is generated so that the symbol $C_{B13}$ indicating use of the text file and the character string b14 indicating the filename of the text file are written in the first code region $C_{B1}$ while the numbers $C_{B23}$ corresponding to the access destination information $C_C$ are written in the second code region $C_{B2}$. An image expressed by the print data is printed in the step S220. Accordingly, in the step S450 in FIG. 7, URLs of access destination pages corresponding to the entry columns $C_A$ can be specified on the basis of the text file of the filename read as one of text files recorded in the RAM 16 from the first code region $C_{B1}$ and the numbers read from the second code regions $C_{B2}$.

Particularly n the print data generated in the step S200, if the code region $C_B$ which is part of the image expressed by the print data can indicate that URLs of access destination pages corresponding to the entry columns $C_A$ can be specified on the basis of the text file, there is an expectation that the number of characters in all specific codes can be reduced compared with the case where URLs are directly written as specific codes. Accordingly, the percentage occupied by the code region $C_B$ in the whole image can be reduced.

In the step S190 in FIG. 2, the text file is recorded, as a filename including a serial number, in the RAM 16. Accordingly, text files corresponding to a plurality of access source files can be recorded so that the text files can be specified on the basis of filenames. In the step S200, print data expressing an image is generated so that the symbol $C_{B13}$ indicating that URLs of access destination pages corresponding to the entry columns $C_A$ can be specified on the basis of the text file and the character string $C_{B14}$ indicating the filename of the text file are written in the code region $C_B$. The image expressed by the print data is printed in the step S220. Accordingly, in the step S450 in FIG. 7, URLs of access destination pages corresponding to the entry columns $C_A$ can be specified on the basis of the text file of the same filename as the character string $C_{B14}$ written in the code region $C_B$.

In the step S210 in FIG. 2, print data (of type 4) is generated so that the symbol $C_{B15}$ indicating use of the access source page and the character string $C_{B16}$ indicating the URL of the access source page are written in the first code region $C_{B1}$ while the numbers $C_{B24}$ corresponding to the access destination information $C_C$ are written in the second code regions $C_{B2}$. An image expressed by the print data is printed in the step S220. Accordingly, in the step S450 in FIG. 7, URLs of access destination pages corresponding to the entry columns $C_A$ can be specified on the basis of the link list generated from the Web page (access source page) after the Web page of the URL read from the first code region $C_{B1}$ is accessed.

Particularly in the print data generated in the step S210, if the code region $C_B$ which is part of the image expressed by the print data can indicate that URLs of access destination pages corresponding to the entry columns $C_A$ can be specified on the basis of the access source page, there is an expectation that the number of characters in all specific codes can be reduced compared with the case where URLs are directly written as specific codes in the entry columns $C_A$ respectively. Accordingly, the percentage occupied by the code region $C_B$ in the whole image can be reduced.

[Modifications of the Embodiment]

Although the embodiment of the invention has been described above, the invention is not limited to the specific embodiment and various modifications may be made.

For example, the embodiment has been described upon the case where the configuration of the communication system according to the invention is applied to the composite machine 1. The configuration of the communication system according to the invention, however, may be applied to another apparatus than the composite machine 1 in a case where the apparatus has a function of providing data communication through the Internet 200.

The embodiment has been described upon the case where the communication system according to the invention is composed of a single composite machine 1. The communication system according to the invention, however, may be composed of a combination of a composite machine 1 and another communication terminal than the composite machine 1 or composed of a combination of communication terminals other than the composite machine 1.

The embodiment has been described upon the case where configuration is made so that the steps in FIGS. 2 and 7 are executed by a computer system provided by the CPU 12 of the composite machine 1. Configuration may be made so that part or all of these steps are executed by another computer system connected to the composite machine 1 wirelessly or by a wire signal transmission line.

The embodiment has been described upon the case where configuration is made so that the steps in FIGS. 2 and 7 are executed according to the procedure stored in the ROM 14 of the composite machine 1. In a case where the composite machine 1 is formed so that data input/output can be made between the composite machine 1 and a recording medium such as an FD or a memory card, configuration may be made so that the steps in FIGS. 2 and 7 are executed according to the procedure recorded in the recording medium.

The embodiment has been described upon the case where the composite machine 1 is connected to a WAN (Wide Area Network) of the Internet 200. The composite machine 1, however, may be also used in a state where the composite machine 1 is connected to an LAN (Local Area Network).

In the embodiment, when a plurality of pages (sheets of paper) are required for printing the print data generated in each of the steps S140, S170, S200 and S210 in FIG. 2, configuration may be made in such a manner that an image is generated for each page (each sheet of paper) so that entry columns $C_A$ corresponding to URLs of access destination pages and code regions $C_B$ as contained in a one-page's image are added to the image of the Web page.

The embodiment has been described upon the case where configuration is made so that character strings enclosed in anchor tags are extracted as access destination information from the source of the access source page when the link list is generated in the step S120 in FIG. 2. When an image tag (<img src="FILENAME" alt="ALTERNATE CHARACTERS">) is enclosed in an anchor tag, configuration, however, may be made so that the character string (alternate characters set in the "alt" attribute) to be displayed as a substitute for the image in this tag is extracted as access destination information.

The embodiment has been described upon the case where configuration is made so that the "printing mode" can be set in a hardware manner by the mode selection switch on the operation panel 42 (see the step S130 in FIG. 2). Configuration may be made so that the "printing mode" can be set in a software manner. Specifically, configuration may be made in such a manner that a flag indicating the printing mode is provided in the RAM 16 of the composite machine 1 so that either "0 (normal mode)" or "1 (space-saving mode)" can be set as the value of the flag in response of the operation of the operation panel 42. In this case, in the step S130 in FIG. 3, a judgment can be made on the basis of the set value of the flag as to whether the printing mode is a "space-saving mode" or not.

The embodiment has been described upon the case where configuration is made so that the whole image on a sheet of paper is read in the step S330 in FIG. 7. Configuration, however, may be made so that the positions (regions) of the entry columns $C_A$ and the code region $C_B$ (first and second code regions $C_{B1}$ and $C_{B2}$) on the sheet of paper can be specified. In this case, images of only the required regions may be read without the step S330 before the regions are extracted or characters and numbers in the regions are recognized in steps after the step S330. For example, here, the term "the positions of the entry columns $C_A$ and the code region $C_B$ in a sheet of paper can be specified" means that an image is printed in the step S220 in FIG. 2 so that the positions of the entry columns $C_A$ and the code region $C_B$ in the sheet of paper are predetermined positions. In this case, images of only the required regions can be read in such a configuration that the image read from positions corresponding to the entry columns $C_A$ in the sheet of paper is formed as an image of the entry columns $C_A$ while the image read from positions of the code region $C_B$ is formed as an image of the code region $C_B$.

The embodiment has been described upon the case where each entry column $C_A$ which is part of the image expressed by the print data generated in the Web printing process shown in FIG. 2 is composed of a plurality of check columns $C_{Aa}$ arranged along the widthwise direction so that command contents are decided on the basis of entry positions of the entry column $C_A$. Each entry column $C_A$, however, may be provided as an entry column in which the user can enter characters, symbols or graphics directly for indicating command contents. In this case, configuration can be made so that, in the step S470 in FIG. 7, characters, symbols or graphics entered in the entry columns are recognized to thereby specify command contents corresponding to the recognized entered contents.

The embodiment has been described upon the case where three kinds of command contents, namely, printing of an access destination page, recording of the access destination page as data and bookmark registration of the access destination page are set as command contents to the URL of the access destination page. For example, a command content such as scale-down printing of the access destination page (i.e., printing of a plurality of pages on a sheet of paper) may be conceived as another command content than the three kinds of command contents. Specifically, a check column $C_{Aa}$ corresponding to the command content may be formed as part of an entry column $C_A$. In this case, when the command content is specified in the step S460 in FIG. 7, the step S470 is carried out so that the access destination page of the URL specified in the step S450 is accessed in the same manner as in the step S410 and then the printer unit 36 is instructed to perform scale-down printing of the image of the accessed access destination page to thereby print the scale-down image of the access destination page.

A command content such as printing of a specific region of an access destination page may be also conceived as the command content to the URL of the access destination page. Specifically, a check column $C_{Aa}$ corresponding to the command content may be formed as part of an entry column $C_A$. In this case, when the command content is specified in the step S460 in FIG. 7, the step S470 is carried out so that the access destination page of the URL specified in the step S450 is accessed in the same manner as in the step S410, the specific region is extracted from the accessed access destination page and the printer unit 36 is instructed to print an image of only the extracted specific region to thereby print the image of the specific region. Incidentally, the term "specific region" means a specific tag written in HTML, such as a title tag (<title>TITLE</title>), a headline tag (<Hx>CHARACTER STRING</Hx>: wherein "x" is an arbitrary number), an image tag (<img src="FILENAME">), and the like.

According to this configuration, when a command content specified in the step S460 in FIG. 7 is a request to print a specific region of an access destination page, a process of printing the specific region of the access destination page can be executed in the step S470. Accordingly, the specific region of the access destination page can be printed when the sheet of paper is read by the composite machine 1 (in the step S330 et seq. in FIG. 7) after the user marks (checks off) a check Column $C_{Aa}$ corresponding to the command content for printing the specific region of the access destination page, in a required entry column $C_A$ on the sheet of paper.

The embodiment has been described upon the case where print data of type 2 or 3 is generated so that a character string $C_{B12}$ or $C_{B14}$ indicating a filename is written in the first code region $C_{B1}$. Such print data, however, may be generated so that codes including characters, symbols or the like capable of specifying filenames respectively are written in the first code region $C_{B1}$.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A communication system used in a state where the communication system is connected to a network, comprising:
   an access unit configured to access a Web page through the network;
   a data extraction unit configured to extract access data from the Web page accessed by the access unit in order to use the access data for accessing access destination pages accessible through the Web page;
   a printing unit configured to print the Web page accessed by the access unit and the access data extracted by the data extraction unit, together with an entry column and a specific code, on a printing medium, the entry column being provided for making a user to enter a command content for requesting a process for the access data extracted by the data extraction unit, the specific code being provided for specifying correspondence of the entry column to the access data;
   a reading unit configured to read the command content entered in the entry column of the printing medium and the specific code from the printing medium printed by the printing unit;
   a data specifying unit configured to specify the access data corresponding to the entry column having the command content read by the reading unit, on the basis of the specific code read together with the command content; and
   a process execution unit configured to execute a process corresponding to the command content read by the reading unit, for the access data specified by the data specifying unit.

2. The communication system as claimed in claim 1, wherein when the command content read by the reading unit includes a request to print the access destination page, the process execution unit instructs the access unit to access the access destination page on the basis of the access data and instructs the printing unit to print the access destination page accessed by the access unit.

3. The communication system as claimed in claim 1, wherein when the command content read by the reading unit includes a request to print a specific region of the access destination page, the process execution unit instructs the access unit to access the access destination page on the basis of the access data and instructs the printing unit to print the specific region of the access destination page accessed by the access unit.

4. The communication system as claimed in claim 1, further comprising a data recording unit configured to record various pieces of data,
   wherein when the command content read by the reading unit includes a request to record the access data, the process execution unit instructs the data recording unit to record the access data.

5. The communication system as claimed in claim 1, further comprising a data recording unit configured to record various pieces of data,
   wherein when the command content read by the reading unit includes a request to record the access destination page as data, the process execution unit instructs the access unit to access the access destination page on the basis of the access data and instructs the data recording unit to record the access destination page accessed by the access unit as data.

6. The communication system as claimed in claim 1, wherein:

the printing unit prints the entry column in which the process requested by the command content is decided according to respective entry positions of the entry column;

the reading unit reads the entry position of the command content in the entry column together with the specific code from the printing medium printed by the printing unit; and the process execution unit executes processes corresponding to the entry position read by the reading unit, for the access data specified by the data specifying unit.

7. The communication system as claimed in claim 1, wherein the printing unit prints the entry column for making the user to selectively enter the command content from a plurality of command contents.

8. The communication system as claimed in claim 7, wherein the entry column comprises a plurality of individual entry columns in which the process requested by the command content is decided according to respective entry positions of the individual entry columns.

9. The communication system as claimed in claim 1, wherein the printing unit configures at least two printing areas on the printing medium, prints the image of the Web page accessed by the access unit to one printing area and prints the entry column and the specific code to the other printing area.

10. The communication system as claimed in claim 9, wherein the printing unit configures the one printing area and the other printing area on an upper part and a lower part of the printing medium, respectively.

11. The communication system as claimed in claim 1, wherein:

the printing unit prints character strings indicating the access data extracted by the data extraction unit, as the specific code; and when the specific code read together with the command content by the reading unit is the character string indicating the access data, the data specifying unit specifies the access data indicated by the character string, as the access data corresponding to each entry column having the command content read.

12. The communication system as claimed in claim 1, further comprising:

a data recording unit configured to record various pieces of data; and an associative record instruction unit configured to instruct the data recording unit to record associative data indicating correspondence of the access data extracted by the data extraction unit to the entry column printed by the printing unit, wherein:

the printing unit prints a first specific code indicating that the access data corresponding to the entry column can be specified on the basis of the associative data recorded by the data recording unit, as the specific code; and when the specific code read together with the command content by the reading unit includes the first specific code, the data specifying unit specifies the access data corresponding to the entry column on the basis of the associative data recorded by the data recording unit.

13. The communication system as claimed in claim 12, wherein:

the associative record instruction unit instructs the data recording unit to record a plurality of the associative data different according to Web pages accessed by the access unit;

the printing unit prints the first specific code indicating that the access data corresponding to the entry column can be specified on the basis of specific associative data in the plurality of associative data recorded by the data recording unit; and when the specific code read together with the command content by the reading unit includes the first specific code, the data specifying unit specifies the access data corresponding to the entry column on the basis of the specific associative data in the plurality of associative data recorded by the data recording unit.

14. The communication system as claimed in claim 1, further Comprising:

a data recording unit configured to record various pieces of data; and an access record instruction unit configured to instruct the data recording unit to record the access data of the Web page accessed by the access unit, wherein;

the printing unit prints a second specific code indicating that the access data corresponding to the entry column can be extracted from a specific region of the Web page accessible on the basis of the access data recorded by the data recording unit, as the specific code; and when the specific code read together with the command content by the reading unit includes the second specific code, the data specifying unit instructs the access unit to access the Web page based on the access data recorded by the data recording unit, instructs the data extraction unit to extract access data from the specific region of the Web page accessed by the access unit and specifies the access data extracted by the data extraction unit as the access data corresponding to the entry column having the command content read.

15. The communication system as claimed in claim 14, wherein:

the printing unit prints the second specific code indicating that the access data corresponding to the entry column can be extracted from the specific region of the Web page accessible on the basis of the specific access data in the plurality of access data recorded by the data recording unit; and when the specific code read together with command content by the reading unit includes the second specific code, the data specifying unit specifies the access data extracted by the data extraction unit from the Web page accessed on the basis of the specific access data in the plurality of access data recorded by the data recording unit, as the access data corresponding to the entry column.

16. The communication system as claimed in claim 1, wherein:

the printing unit prints the access data of the Web page accessed by the access unit and a third specific code indicating that the access data corresponding to the entry column can be extracted from a specific region of the Web page accessed by the access unit, as the specific code; and when the specific code read together with the command content by the reading unit includes the third specific code, the data specifying unit instructs the access unit to access the Web page based on the access data indicated by the third specific code, instructs the data extraction unit to extract access data from the specific region of the Web page accessed by the access unit and specifies the access data extracted by the data extraction unit as the access data corresponding to the entry column having the command content read.

17. The communication system according to claim 1, further comprising a correspondence data forming unit configured to form correspondence data that includes the access data and identification information that is associated with the access data and that is used to identify the access data.

18. The communication system according to claim 17, wherein the printing unit prints the identification information as the specific code on the printing medium.

19. A communication terminal used in a state where the communication terminal is connected to a network, comprising:
an access unit configured to access a Web page through the network;
a data extraction unit configured to extract access data from the Web page accessed by the access unit in order to use the access data for accessing access destination pages accessible through the Web page; and
a printing unit configured to print the Web page accessed by the access and the access data extracted by the data extraction unit, together with an entry column and a specific code, on a printing medium, the entry column being provided for making a user to enter a command content for requesting a process for the access data extracted by the data extraction unit, the specific code being provided for specifying correspondence of the entry column to the access data.

20. communication terminal as claimed in claim 19, wherein the printing unit prints character strings indicating the access data extracted by the data extraction unit, as the specific code.

21. The communication terminal as claimed in claim 19, further comprising:
a data recording unit configured to record various pieces of data; and
an access record instruction unit configured to instruct the data recording unit to record the access data of the Web page accessed by the access unit,
wherein the printing unit prints a second specific code indicating that the access data corresponding to the entry column can be extracted from a specific region of a Web page accessible on the basis of the access data recorded by the data recording unit, as the specific code.

22. The communication terminal as claimed in claim 21, wherein the printing unit prints the second specific code indicating that the access data corresponding to the entry column can be extracted from a specific region of specific access data in the access data recorded by the data recording unit.

23. The communication terminal as claimed in claim 19, wherein the printing unit prints a third specific code indicating that the access data of the Web page accessed by the access unit and the access data corresponding to the entry column can be extracted from a specific region of the Web page accessed by the access unit, as the specific code.

24. A computer-readable medium storing a system control program product for causing a computer system to execute procedures for controlling a communication system used in a state where the communication system is connected to a network, comprising:
an accessing unit that accesses a Web page through the network;
an extracting unit that extracts access data from the Web page accessed by the accessing unit in order to use the access data for accessing access destination pages accessible through the Web page;
a printing unit that prints the Web page accessed by the accessing unit and the access data extracted by the data extraction unit, together with an entry column and a specific code, on a printing medium, the entry column being provided for making a user enter a command content to the access data extracted by the extracting unit, the specific code being provided for specifying correspondence of the entry column to the access data;
a reading unit that reads the command content entered in the entry column in the printing medium and the specific code from the printing medium printed by the printing unit;
a specifying unit that specifies the access data corresponding to the entry column having the command content read by the reading unit, on the basis of the specific code read together with the command content; and
an executing unit that executes a process corresponding to the command content read by the reading unit, for the access data specified by the specifying unit.

25. A computer-readable medium storing a terminal control program product for causing a computer system to execute procedures for controlling a communication terminal used in a state where the communication terminal is connected to a network, comprising:
an accessing unit that accesses a Web page through the network;
an extracting unit that extracts access data from the Web page accessed by the accessing unit and the access data extracted by the data extraction unit in order to use the access data for accessing access destination pages accessible through the Web page; and
a printing unit that prints the Web page accessed by the accessing unit, together with an entry column and a specific code on a printing medium, the entry column being provided for making a user enter a command content to the access data extracted by the extracting unit, the specific code being provided for specifying correspondence of the entry column to the access data.

* * * * *